(12) United States Patent
Gogna et al.

(10) Patent No.: US 11,409,278 B2
(45) Date of Patent: Aug. 9, 2022

(54) SYSTEM AND METHOD FOR PROVIDING A TELEOPERATION INSTRUCTION TO AN AUTONOMOUS VEHICLE

(71) Applicant: Zoox, Inc., Foster City, CA (US)

(72) Inventors: Ravi Gogna, San Jose, CA (US); Meredith James Goldman, Redwood City, WA (US)

(73) Assignee: Zoox, Inc., Foster City, CA (US)

( * ) Notice: Subject to any disclaimer, the term of this patent is extended or adjusted under 35 U.S.C. 154(b) by 17 days.

(21) Appl. No.: 16/523,809

(22) Filed: Jul. 26, 2019

(65) Prior Publication Data

US 2021/0026350 A1  Jan. 28, 2021

(51) Int. Cl.
*G05D 1/00* (2006.01)
*G06V 20/58* (2022.01)

(52) U.S. Cl.
CPC ......... *G05D 1/0038* (2013.01); *G05D 1/0061* (2013.01); *G05D 1/0088* (2013.01); *G06V 20/58* (2022.01); *G05D 2201/0213* (2013.01)

(58) Field of Classification Search
CPC .. G05D 1/0038; G05D 1/0088; G05D 1/0061; G05D 2201/0213; G05D 1/0027; G06K 9/00805; G06K 9/6247; G06K 9/6218; G06K 9/6267
USPC .......................................................... 701/23
See application file for complete search history.

(56) References Cited

U.S. PATENT DOCUMENTS

| | | | |
|---|---|---|---|
| 5,707,117 A * | 1/1998 | Hu .................... | B60G 17/0185 180/197 |
| 8,849,494 B1 | 9/2014 | Herbach et al. | |
| 9,494,439 B1 * | 11/2016 | Ross .................... | G05D 1/0027 |
| 10,065,664 B1 * | 9/2018 | Hausmann ................ | B61J 3/12 |
| 2001/0037163 A1 | 11/2001 | Allard | |
| 2008/0246335 A1 * | 10/2008 | Spieker .................. | B60T 8/885 303/122.08 |
| 2014/0163805 A1 * | 6/2014 | Braunstein .............. | E02F 9/265 701/23 |
| 2014/0218508 A1 * | 8/2014 | Kim .................... | G05D 1/0246 348/118 |
| 2016/0358475 A1 | 12/2016 | Prokhorov | |
| 2018/0025558 A1 * | 1/2018 | Chen ................. | B60W 50/0205 701/29.7 |
| 2018/0095456 A1 * | 4/2018 | Obaidi ................... | G07C 5/008 |
| 2018/0136651 A1 | 5/2018 | Levinson et al. | |

(Continued)

OTHER PUBLICATIONS

International Search Report and Written Opinion dated Oct. 22, 2020, Patent Application No. PCT/US2020/043623, 8 pages.

*Primary Examiner* — Muhammad Shafi

(74) *Attorney, Agent, or Firm* — Davis Wright Tremaine LLP

(57) ABSTRACT

The present disclosure is directed to systems and techniques for providing a teleoperation instruction to an autonomous vehicle. While the autonomous vehicle is travelling to a destination, the autonomous vehicle may encounter a situation preventing the autonomous vehicle from travelling to the destination. A control center may receive information from the autonomous device and provide instructions with limited controls for the autonomous vehicle to navigate to an intermediate position. In such an intermediate position, the may make way for an emergency vehicle, obtain additional sensor data for continued autonomous planning, signal intent to other objects in the environment, and the like.

20 Claims, 9 Drawing Sheets

(56) References Cited

U.S. PATENT DOCUMENTS

| | | |
|---|---|---|
| 2018/0196437 A1 | 7/2018 | Herbach et al. |
| 2018/0246529 A1 | 8/2018 | Hu et al. |
| 2018/0364732 A1 | 12/2018 | Yaldo et al. |
| 2018/0365908 A1* | 12/2018 | Liu ..................... G05D 1/0044 |
| 2019/0011910 A1 | 1/2019 | Lockwood et al. |
| 2019/0235490 A1 | 8/2019 | Tsusaka et al. |
| 2020/0004240 A1 | 1/2020 | Biehler et al. |
| 2020/0276973 A1 | 9/2020 | Meijburg et al. |

* cited by examiner

SYSTEM AND METHOD FOR PROVIDING A TELEOPERATION INSTRUCTION TO AN AUTONOMOUS VEHICLE

BACKGROUND

Autonomous vehicles typically use various techniques to navigate in real-world conditions. In doing so, autonomous vehicles constantly take into account the environmental circumstances and surroundings while performing a task. Despite great efforts developing the systems used by autonomous vehicles to navigate, the real world can be unpredictable in ways that prevent vehicles from operating completely autonomously. For example, in some situations, a change in environmental circumstance such as traffic or the sudden emergence of an emergency vehicle may create challenges that hinder autonomous vehicles' ability to perform a task.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
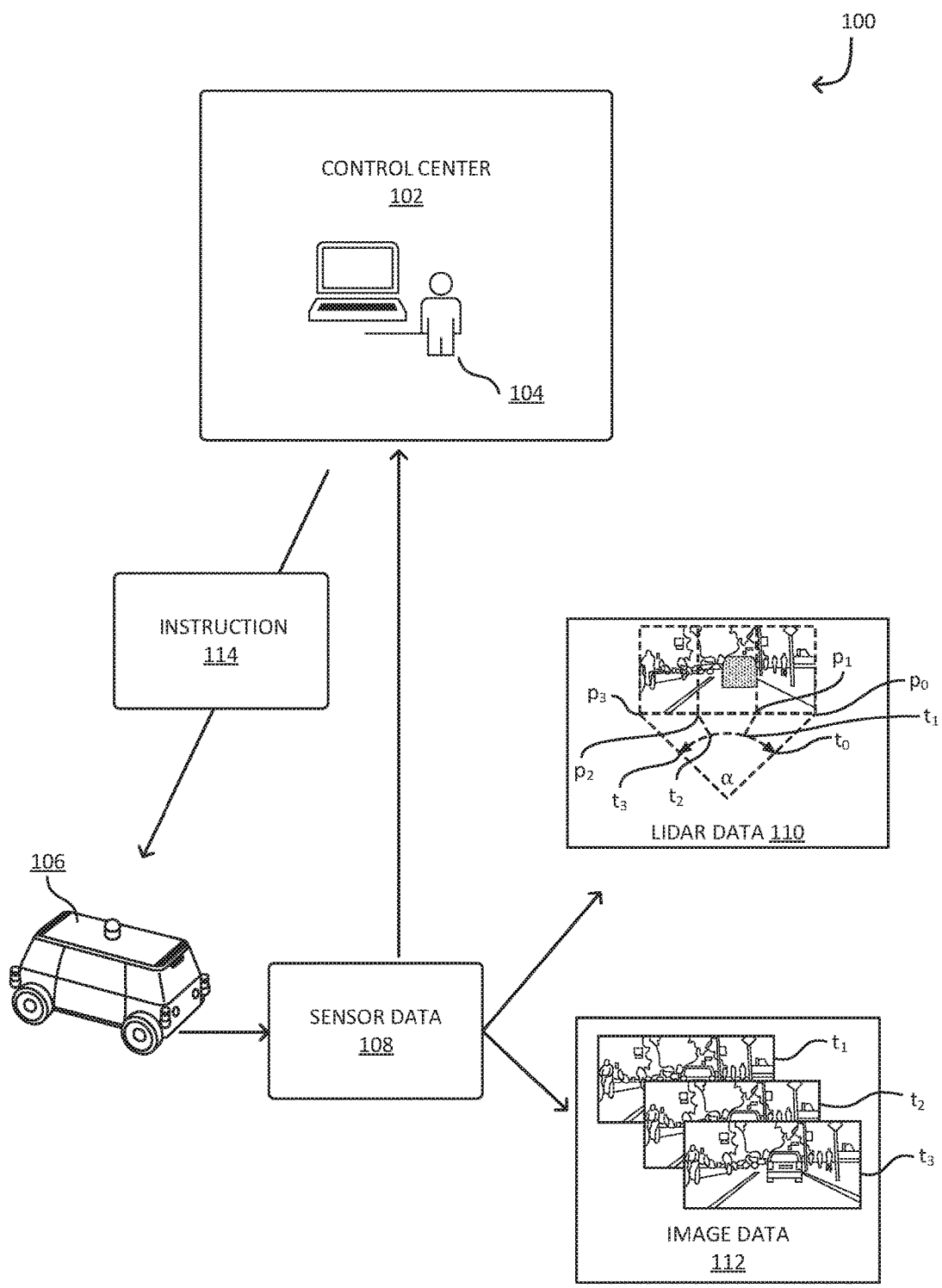
FIG. 1 illustrates an example system in which an autonomous vehicle transmits sensor data and receives instructions from a control center.

This disclosure describes methods, apparatuses, and systems for implementing a teleoperation (e.g., remote) instruction in an autonomous vehicle based on changes to environmental circumstances affecting the operations of an autonomous vehicle. An autonomous vehicle may be programmed with a task such as proceeding to a destination. The autonomous vehicle may comprise various sensors and processing systems that it may utilize to navigate to the destination. The autonomous vehicle may encounter, en route to the destination, various situations that it may be unable to process and navigate. In some examples, such situations can include being stuck in traffic, the sudden emergence of emergency vehicles, fallen debris, sporting balls that residing on a street, and the like. The autonomous vehicle may transmit various aspects of the encountered situation, such as sensor data, positional data, and other information regarding the vehicle and the situation, to a control center. The control center may receive the data, and perform various processes and analysis on the data. The control center may transmit further instructions to the autonomous vehicle such that the autonomous vehicle may process and navigate the situation, and continue on to the destination. The autonomous vehicle may receive these instructions, and utilize them along with the other various processing systems it comprises to navigate the encountered situation and continue to travel to the destination. In at least some examples described herein, such guidance may comprise a minor adjustment in position and/or orientation (e.g., pose) such that the vehicle may continue to plan and drive autonomously. In at least some examples, the adjustment may indicate an intent to the other drivers or persons in the environment. The intent, by the vehicle, allows for other drivers on the road, for example, to have a better understanding of what the vehicle intends to do or perform (e.g., the vehicle nudges a few meters to the right and stopping so that it indicates to other drivers that the vehicle is intending or about to turn right at the next light. In some examples, the adjustment may provide additional sensor data, differing starting constraints, and the like, such that the vehicle (given the new starting position) is capable of planning a trajectory where previously precluded in the original position. As a non-limiting example, a starting position may yield no viable trajectory for continuing along a path due to algorithmic limitations. In such an example, a teleoperator may provide guidance to make an adjustment and, after such an adjustment, a trajectory can be determined autonomously by the vehicle.

In some examples, the autonomous vehicle may be programmed with a destination, such that the autonomous vehicle may travel to the destination. The destination may be Global Positioning System (GPS) coordinates, a landmark, address, or other indicator of a location. The various processing systems may comprise various machine learning algorithms, machine learned models, neural networks, and/or variations thereof to provide instructions to the autonomous vehicle en route to the destination.

While performing the operations associated with the machine learned model, the autonomous vehicle may encounter a situation. The control center may obtain communications from the autonomous vehicle regarding the encountered situation. The control center may then, based upon the received data associated with the situation, provide instructions to the autonomous vehicle. In some examples, the instructions may be referred to as guidance instructions or a teleoperation instruction and include information such as a position and/or orientation that the autonomous vehicle may utilize to navigate the situation.

The autonomous vehicle may receive the instructions/guidance instructions from the control center, and utilize them to navigate the encountered situation. In some examples, the autonomous vehicle may simply follow the received instructions. In some examples, the autonomous vehicle may utilize the received instructions along with the various processing systems it may comprise to navigate the encountered situation. After the autonomous vehicle obtains the instructions from the control center, the communication channel with the control center may cease. In some examples the autonomous vehicle may continue to communicate with the control center until the encountered situation is navigated or resolved or even after the situation is resolved.

The techniques described herein are utilized to allow an autonomous vehicle to safely navigate a situation when the situation prevents the autonomous vehicle from proceeding to a destination. In some examples, the situation may be that the autonomous vehicle is stuck in a position and/or encounters an environmental condition where it needs additional guidance to navigate out of the position and/or situation (e.g., stuck behind cars in traffic, encounters an object in the road, emergency vehicle, while in an emergency state, approaching behind the autonomous vehicle). The autonomous vehicle may send a request for guidance to a control center. The control center may then provide the autonomous vehicle with instructions to navigate the situation in a safe manner. The instruction provided is typically performed by the autonomous vehicle under limited controls at or below a speed threshold so that it prevents a nefarious actor from controlling the vehicle to go out into traffic. By seeking guidance from a control center, the autonomous vehicle may be able to quickly, efficiently, and safely navigate the situation and become unstuck from its current position under a controlled environment so that it can eventually proceed to its destination.

FIG. 1 illustrates an example system 100 in which a control center 102, which is controlled by an entity 104, user, or computing device (in any case may also referred to herein as a teleoperator), receives sensor data 108 from autonomous vehicle 106, which may include LIDAR data 110 and image data 112, and provides an instruction 114 to the autonomous vehicle 106. In some examples, the autonomous vehicle 106 may be any suitable machine utilized for transportation, such as a railed vehicle, motor vehicle, watercraft, amphibious vehicle, and/or variations thereof. In some examples, the autonomous vehicle 106 may include one or more subsystems of architecture 900, described below in reference to FIG. 9.

The autonomous vehicle 106 may comprise various sensors that generate sensor readings. The sensors may continuously analyze the environment surrounding the autonomous vehicle 106, and may generate sensor data 108. The sensor data 108 may include LIDAR data 110 and image data 112, as well as other data from various subsystems and sensors of the autonomous vehicle 106. In various examples, the sensor data 108 includes data obtained from LIDAR sensors, cameras, and/or radars that may be present on the autonomous vehicle 106, or otherwise associated with or accessed by the autonomous vehicle 106. The autonomous vehicle 106 may additionally comprise various processing systems and subsystems that may control the autonomous vehicle 106. Such processing systems can include various machine learning algorithms, analytical tools, and/or variations thereof. In some examples, the autonomous vehicle 106 may utilize a vehicle controller (not depicted in FIG. 1, but further information regarding the vehicle controller can be found in the description of FIG. 4).

In some examples, the autonomous vehicle 106 may be programmed to navigate to a destination. The destination may be provided to the autonomous vehicle 106 by the control center 102, entity 104, other entities not depicted in FIG. 1, and/or variations thereof. The autonomous vehicle 106 may utilize the various processing systems to navigate to the destination. In some examples, the destination may be a specific location, which may be indicated by GPS coordinates, waypoints, address, and/or variations thereof. The destination may also be a landmark, a building, a house, or a region. The autonomous vehicle may continuously analyze its environment utilizing the various sensors it comprises, produce sensor data from the sensors, and utilize the sensor data and the various processing systems the autonomous vehicle 106 may comprise to navigate to the destination. Additionally, the autonomous vehicle 106 may utilize a machine learned model that may be implemented by the various processing systems to navigate.

The autonomous vehicle 106 may encounter a situation that it is unable to process and/or navigate. In at least some, but not all examples, the techniques described herein may performed when the autonomous vehicle 106 is moving at a limited speed that is below a specific speed threshold. An example of limited speed may be that the autonomous vehicle 106 is operating at or under 5 miles per hour. The situation may prevent the autonomous vehicle 106 from proceeding to its destination. As an example, the situation may be that the autonomous vehicle 106 is stuck in traffic or moving very slowly in traffic. To detect that the autonomous vehicle 106 is actually stuck in traffic the autonomous vehicle 106 may detect that the autonomous vehicle 106 has not moved for a period of time (e.g., 5 minutes). In another example, the situation may be that the autonomous vehicle 106 is occluded by an object and cannot safely determine how to proceed past a particular location. In yet another example, the situation may be that the autonomous vehicle 106 is waiting at a traffic stop light and an emergency vehicle, with its sirens on and while in an emergency state, is right behind the autonomous vehicle 106 seeking to get by. In other words, a situation that an emergency vehicle is in an emergency state may include that the emergency vehicle presents one or more indicators such as emergency lights, audio signals (e.g., sirens), and other ways (e.g., transmit information about its emergency state via short-range radio signals, over internet, etc.). The autonomous vehicle 106 may attempt to process the situation and determine it is unable to, within parameters in which it is allowed to navigate (or otherwise able to determine a trajectory to navigate due to kinematic and/or planning constraints of the various planning algorithms), navigate the situation based on various sensor data from the autonomous vehicle 106 in view of the machine learned model. In some examples, the autonomous vehicle 106 may be able to navigate the situation, but the navigation of the situation may require disobeying various road regulations. In situations such as those presented above, the autonomous vehicle 106 may detect that these situations (and others in which a solution for a trajectory cannot be determined by the autonomous vehicle 106) satisfy a set of conditions and based on that satisfaction, the autonomous vehicle 106 may seek guidance from a control center 102. Such conditions may include factors that analyzes the situations surrounding the autonomous vehicle 106 in view of road regulations, potential risk of injuring a human or animal, navigation possibilities, and/or variations thereof. In an alternate embodiment, the autonomous vehicle 106 may utilize a threshold to determine whether the situation (e.g., a certain number of conditions of the set of conditions at minimum must be satisfied to determine that the situation is not able to be navigated) indicates that a call may need to be made to the control center 102 to seek guidance.

In response to detection of such a situation, the autonomous vehicle 106 may contact the control center 102. The autonomous vehicle 106 may communicate to and from the control center 102 through one or more communication channels and/or networks, such as a cellular network, radio network, and/or variations thereof. The autonomous vehicle 106 may transmit various aspects of the situation to the control center 102, such as the sensor data 108, which may specifically be sensor data regarding the situation, the conditions utilized to determine the situation, as well as other various data from other subsystems of the autonomous vehicle 106. The sensor data 108 may include photographic data including a stream of video captured by one or more cameras of the autonomous vehicle 106 to enable an operator to visually see what the vehicle is encountering in its environment, as well as any representation thereof (bounding boxes, semantically segmented images, and the like). The sensor data 108 may include audio data captured by one or more audio recorders or microphones of the autonomous vehicle 106 to enable an operator to hear what the vehicle is encountering in its environment. Of course, any sensor data and/or representation thereof (including downsampled, or compressed version) may be streamed to such a teleoperator.

The control center 102, which may be in a separate physical location from the autonomous vehicle 106, may include various computing systems, such as one or more servers, virtual computing instances, data stores, etc., and/or variations thereof, configured to facilitate the analysis of the sensor data 108 and the generation of the instruction 114. In some examples, the control center 102 may be a single computing device such as a mobile phone, tablet, or laptop. The control center 102 may employ authorized users or engineers, via a computing device at the control center 102, to analyze the data obtained surrounding the autonomous vehicle 106 and provide instructions/guidance instructions to the autonomous vehicle 106 to perform. In an example, the instructions/guidance are provided to the autonomous vehicle 106 to perform the instructions/guidance using four-wheel steering at a slow or specific speed. In other words, the control center 102 issues instructions/guidance with limited control of the autonomous vehicle 106 so that it operates or performs the instructions/guidance at or below a specific speed. In an example, the autonomous vehicle 106 may perform the instructions/guidance at a speed of 5 miles per hour or less and then stop and either proceed to the destination or seek further guidance from the control center 102. In some examples, the control center 102 may be referred to as the command center, teleoperation center, or central command.

In some examples, the control center 102 may comprise storage, one or more processor(s), a memory, and an operating system. The storage, the processor(s), the memory, and the operating system may be communicatively coupled over a communication infrastructure. Optionally, the control center 102 may interact with a user, or environment, via input/output (I/O) device(s), as well as one or more other computing devices and/or entities, such as the autonomous vehicle 106 over a network, via the communication infrastructure. The operating system may interact with other components to control one or more applications. In some instances, the control center 102 may implement any hardware and/or software to implement various subsystems as described herein.

The control center 102 may utilize the obtained sensor data to determine the instruction 114 that the autonomous vehicle 106 may utilize to navigate the situation. In some examples, the entity 104, which may be an operator, an authorized user for the control center 102, a network of operators, an artificial intelligence program, a computer application/program, and/or variations thereof, may determine the instruction 114 based on the sensor data 108, as well as any other transmitted data from the autonomous vehicle 106. The entity 104 may utilize the sensor data 108, location of the autonomous vehicle 106, and other various conditions of the environment surrounding the autonomous vehicle 106, to determine the instruction 114. The entity 104 may utilize a Graphical User Interface (GUI), such as the GUI 214 as described in connection with FIG. 2, to determine the instruction 114.

The instruction 114 may comprise position and/or orientation instructions. For example, the instruction 114 instructs the autonomous vehicle 106 to move three feet forward and rotate 90 degrees. The instruction 114 may also comprise a location or waypoint. For example, the instruction 114 can instruct the autonomous vehicle 106 to travel to a specific location or waypoint, which can be denoted as an intermediate destination. In various examples, the instruction 114 may be in the format of a computer file, such as a text file, a signal, and/or variations thereof. In some examples, the instruction 114 may indicate to the autonomous vehicle 106 movements that cause the autonomous vehicle 106 to move to a different location, where the different location may allow the autonomous vehicle 106 to be free from a deadlocked position that it may be in as part of the situation it is unable to navigate. For example, in those scenarios in which the vehicle is occluded, the teleoperator may recognize such a situation and provide explicit approval for the vehicle to move 3 feet forward (potentially overriding some policies, such as to stop at a designated stop sign) such that the vehicle can receive enough data to plan autonomously through the intersection.

Following the receipt of the instruction 114, the autonomous vehicle 106 may utilize the instruction 114 along with its various processing systems, which may implement the machine learned model as described above, to navigate the situation. In some examples, the autonomous vehicle 106, via the machine learned model, may determine that the instruction 114 is viable and may simply follow the instruction 114. For example, the instruction 114 may indicate that the autonomous vehicle 106 must move three feet forward; the autonomous vehicle 106, via the machine learned model, may determine that the instruction 114 are viable (e.g., there are no blockages three feet ahead of the autonomous vehicle 106), and move three feet forward. In other examples, the autonomous vehicle 106, via the machine learned model, may determine that the instruction 114 is not immediately viable, and take various intermediary steps until the instruction 114 are viable, or no longer needed. For example, the instruction 114 may indicate that the autonomous vehicle 106 must move three feet forward, however, a volleyball may be two feet ahead; the autonomous vehicle 106 may either wait until the volleyball is no longer two feet ahead and move three feet ahead, or completely abandon the instruction 114 and request further instruction from the control center 102. It should be noted that, in various examples, the autonomous vehicle 106, via the machine learned model, may utilize the instruction 114 in any capacity, from not utilizing the instruction 114 in any capacity, to minimally taking into account the instruction 114 to determine steps to navigate an encountered situation, to utilizing the instruction 114 fully to determine steps to navigate an encountered situation.

Figure 2:
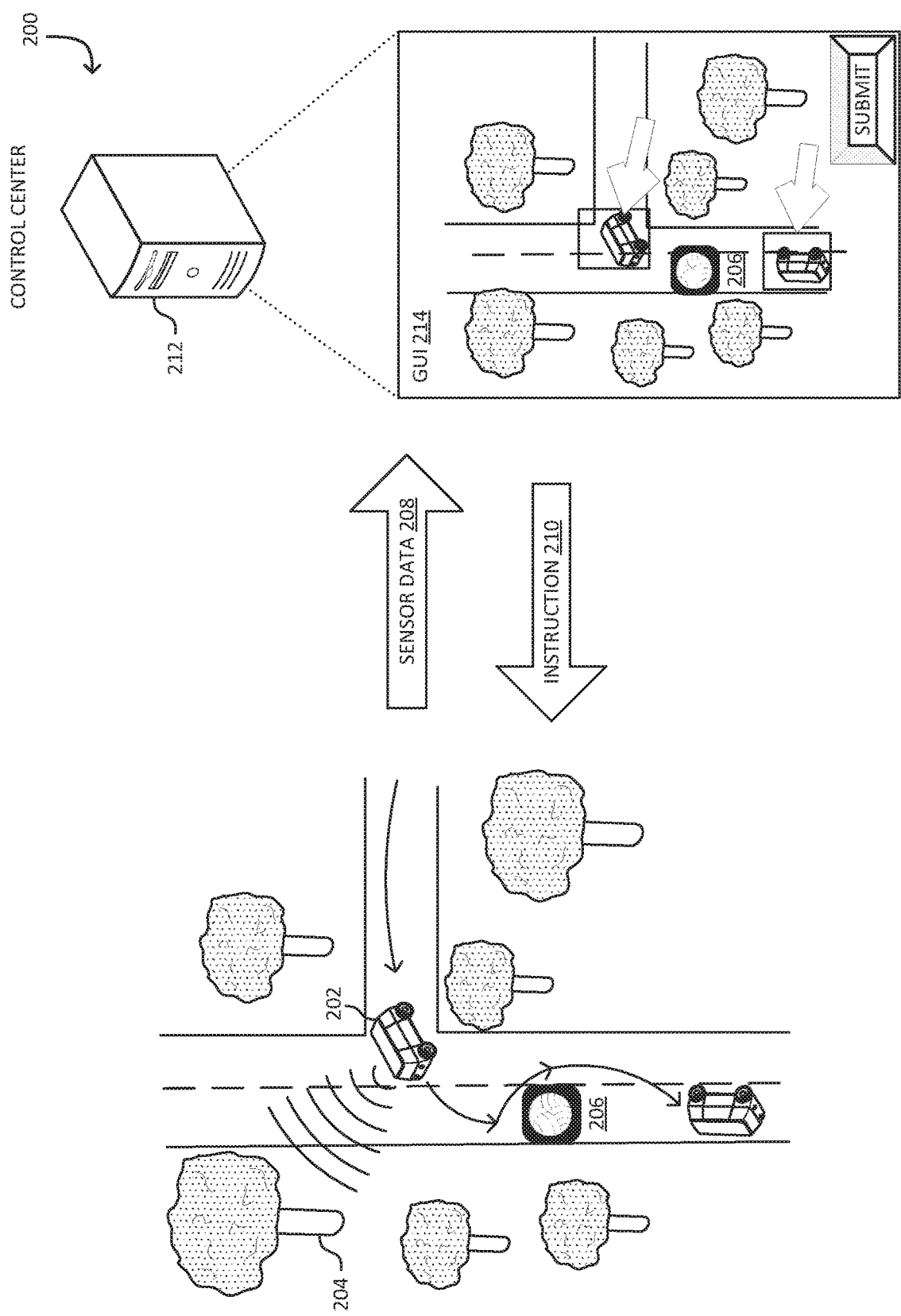
FIG. 2 illustrates an example in which an autonomous vehicle transmits sensor data and receives instructions from a control center.

FIG. 2 illustrates an example 200 of an autonomous vehicle 202 within an environment 204, which comprises a volleyball 206, that communicates sensor data 208 to a control center 212, which utilizes a GUI 214 and transmits an instruction 210 to the autonomous vehicle 202. In various examples, the autonomous vehicle 202, sensor data 208, instruction 210, and control center 212 are the same as the autonomous vehicle 106, sensor data 108, instruction 114, and control center 102, respectively, as described in connection with FIG. 1. In some examples, autonomous vehicle 202 may include one or more subsystems of architecture 900, described below in reference to FIG. 9.

The autonomous vehicle 202 may be programmed with a destination that requires the autonomous vehicle 202 to traverse the environment 204. The autonomous vehicle 202 may traverse the environment 204, and encounter the volleyball 206. The volleyball 206 may be blocking the route the autonomous vehicle 202 is instructed by the machine learned model to take to travel to the destination. The autonomous vehicle 202 may analyze the environment 204 and volleyball 206, and determine it has encountered a situation that it is unable to navigate. In some examples, the autonomous vehicle 202 may utilize various criteria and other sensor data from the autonomous vehicle 202 to determine that the situation is prevented from being navigated. For example, in reference to the example 200, the autonomous vehicle 202 may analyze that the situation satisfies a set of conditions which may include determining that the volleyball 206 is blocking the route to the destination, and travelling around the volleyball 206 may break various road regulations.

Following the determination that the set of conditions is satisfied and the situation is unable to be navigated, the autonomous vehicle 202 may communicate to the control center 212 to seek guidance. The autonomous vehicle 202 may transmit various aspects of the situation to the control center 212. The autonomous vehicle 202 may transmit the sensor data 208, which may be data, such as LIDAR data, image data, and/or variations thereof, gathered from various sensors the autonomous vehicle 202 may comprise. The control center 212 may receive the sensor data 208, and generate the GUI 214 depicting the situation the autonomous vehicle 202 is unable to navigate.

The GUI 214, or graphical user interface, may be a user interface that allows entities to interact with the control center 212 to determine the instruction 210. The GUI 214 may be operated by an entity, such as an operator, an administrator, artificial intelligence program, and/or variations thereof, that has access to the control center 212. The entity may determine the next course of action, or instructions, for the autonomous vehicle 202 to navigate the situation. For example, with regards to the example 200, the GUI 214 may comprise a visual depiction of the situation that the autonomous vehicle 202 has encountered and is unable to navigate. Continuing with the example, the entity may determine that the best course of action for the autonomous vehicle 202 is to circumnavigate the volleyball 206. Further continuing with the example, the entity may select, through the GUI 214, a path and/or location for the autonomous vehicle 202 to circumvent the volleyball 206 even though circumventing the volleyball may conflict with instructions provided by machine learned model. Further continuing with the example, the selections may be submitted by the entity through the GUI 214, which may be processed by the control center 212 into the appropriate format and transmitted as the instruction 210 to the autonomous vehicle 202. In various examples, through the GUI 214, the entity may input any form of instructions for the autonomous vehicle 202, such as input cardinal directions, radius, and/or orientation instructions, which may be transmitted as the instruction 210 for the autonomous vehicle 202. The instruction 210 issued may be confined or limited to a small radius and orientation for the autonomous vehicle 202 to perform. In an example, the instruction 210 may be a small range of motion (e.g., move 3 feet and stop) and/or change in orientation (e.g., shift 90 degrees and stop).

The autonomous vehicle 202 may receive the instruction 210, and determine the viability of the instruction 210. The instruction 210 may include information such as position, direction, and/or speed for the autonomous vehicle 202 to follow. The instruction may include information for the autonomous vehicle 202 to navigate to an intermediate destination that is within a radius of a current position of the autonomous vehicle 202. The autonomous vehicle 202 may input the instruction 210 into various processing systems the autonomous vehicle 202 may comprise. The autonomous vehicle 202 may analyze the environment 204, as well as the instruction 210, and determine that the instruction 210 is viable. For example, the autonomous vehicle 202 may analyze the environment 204, and determine that there are no obstacles blocking the path indicated by the instruction 210. The autonomous vehicle 202 may then follow the instruction 210 at a limited speed and perform the instruction 210 to the intermediate destination. Continuing with the example, the intermediate destination may be the position of the autonomous vehicle 202 that circumvents the volleyball 206 so that the volleyball 206 is behind the autonomous vehicle 202. That is, the autonomous vehicle 202 may utilize the instruction 210 and adjust its controls and navigational plan autonomously in order to navigate around the volleyball 206, and continue to its destination.

Figure 3:
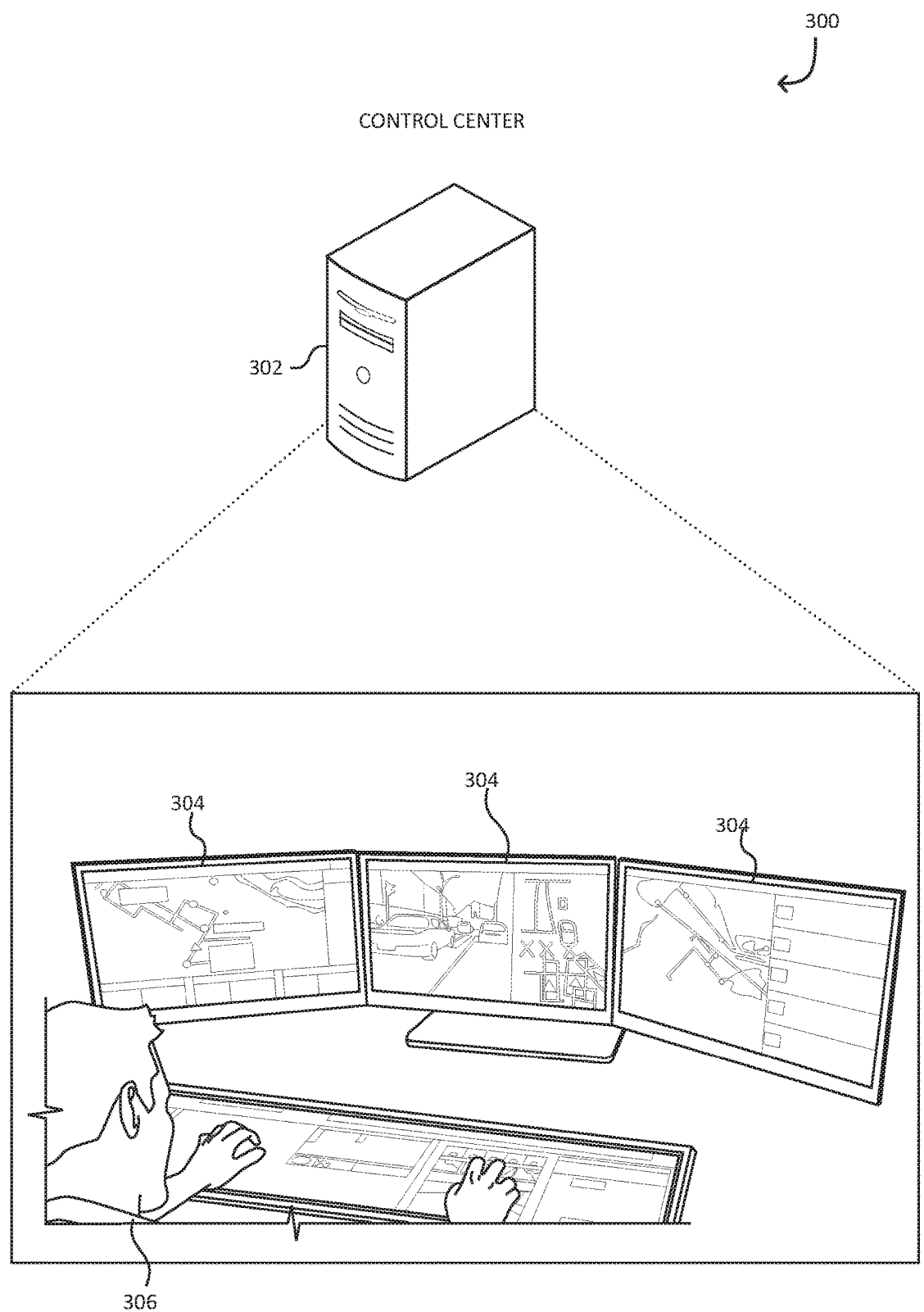
FIG. 3 illustrates an example diagram of a control center.

FIG. 3 illustrates an example 300 of a control center 302 and at least one or more GUIs 304. In various examples, the control center 302 is the same as the control center 212 as described in connection with FIG. 2. The GUI 304 may be a graphical user interface that is utilized by the control center 302 to determine instructions for an autonomous vehicle. The autonomous vehicle may be programmed with a destination such that it will travel to the destination utilizing various processing systems the autonomous vehicle may comprise. In some examples, the autonomous vehicle may include one or more subsystems of architecture 900, described below in reference to FIG. 9. The autonomous vehicle may encounter a situation, and determine to seek instructions from the control center 302. As part of requesting instructions from the control center 302, the autonomous vehicle may submit various data, such as sensor data, data regarding the situation, and/or variations thereof, to the control center 302.

The GUI 304 may be utilized by an entity 306 that has access to the control center 302. The entity 306 may be one or more operators, one or more artificial intelligence programs, one or more administrators, which may be administrators of the control center 302, one or more computer applications, and/or variations thereof. In an embodiment, the entity 306 operating the GUI 304 is any appropriate entity that can determine instructions for the autonomous vehicle. The GUI 304 may comprise various graphical elements that enable the entity 306 to determine instructions for the autonomous vehicle. As depicted in the example 300, the GUI 304 comprises a depiction of the autonomous vehicle and its environment, and various controls that allow the entity 306 to determine a movement for the autonomous vehicle. For example, the entity 306 specifies a distance the autonomous car to travel in a direction selected by arrows, which controls how the autonomous vehicle nudges. In some examples, the entity 306 may direct the autonomous vehicle to perform a desired orientation since the entity 306 has control over the autonomous vehicle using four-wheel steering. In an example, using arrow buttons may be used to instruct the autonomous vehicle to rotate to a desired orientation. In other examples, additional parameters such as speed may be entered by the entity 306r at the control center via the GUI 304.

The entity 306 may select a direction and a distance based on data received from the autonomous vehicle for the autonomous vehicle to navigate the situation. Such data can include sensor data, which may be based on sensors associated with the autonomous vehicle, that may reflect the state of the environment surrounding the autonomous vehicle. As an example, the sensor data may be represented as raw image streams on the GUI 304. Following the selection of a direction (e.g., via arrows) and a distance to move in the selected direction by the entity 306, the control center 302 may process the selected direction and distance into appropriate instructions for the autonomous vehicle to move in the selected direction and distance, and transmit the instructions to the autonomous vehicle. The autonomous vehicle may utilize the instructions, along with the various processing systems, which may comprise a machine learned model or a planner system, to navigate to an intermediate destination that may result in the autonomous vehicle navigating the encountered situation that it was previously unable to navigate (e.g., based on additional visibility, initial position for solving a kinematic equation, and the like). In some examples, the entity 306 may further select an additional direction and distance for the autonomous vehicle; the control center 302 may further process the additional selections and transmit them as a second instruction for the autonomous vehicle. The second instruction may cause the autonomous vehicle to travel to a second intermediate destination, which may allow the autonomous vehicle to navigate the encountered situation that it was previously unable to navigate. The second instruction may be determined by the entity 306 and transmitted from the control center 302 without additional input from the autonomous vehicle. It should be noted that, in various examples, the GUI 304 may be depicted in various formats, and may include various user elements that allow an entity 306 to select a plurality of options for an autonomous vehicle to perform, such as a position, orientation, location, waypoint, cardinal direction, distance, speed input, and/or variations thereof, which may be utilized to determine instructions for the autonomous vehicle.

Figure 4:
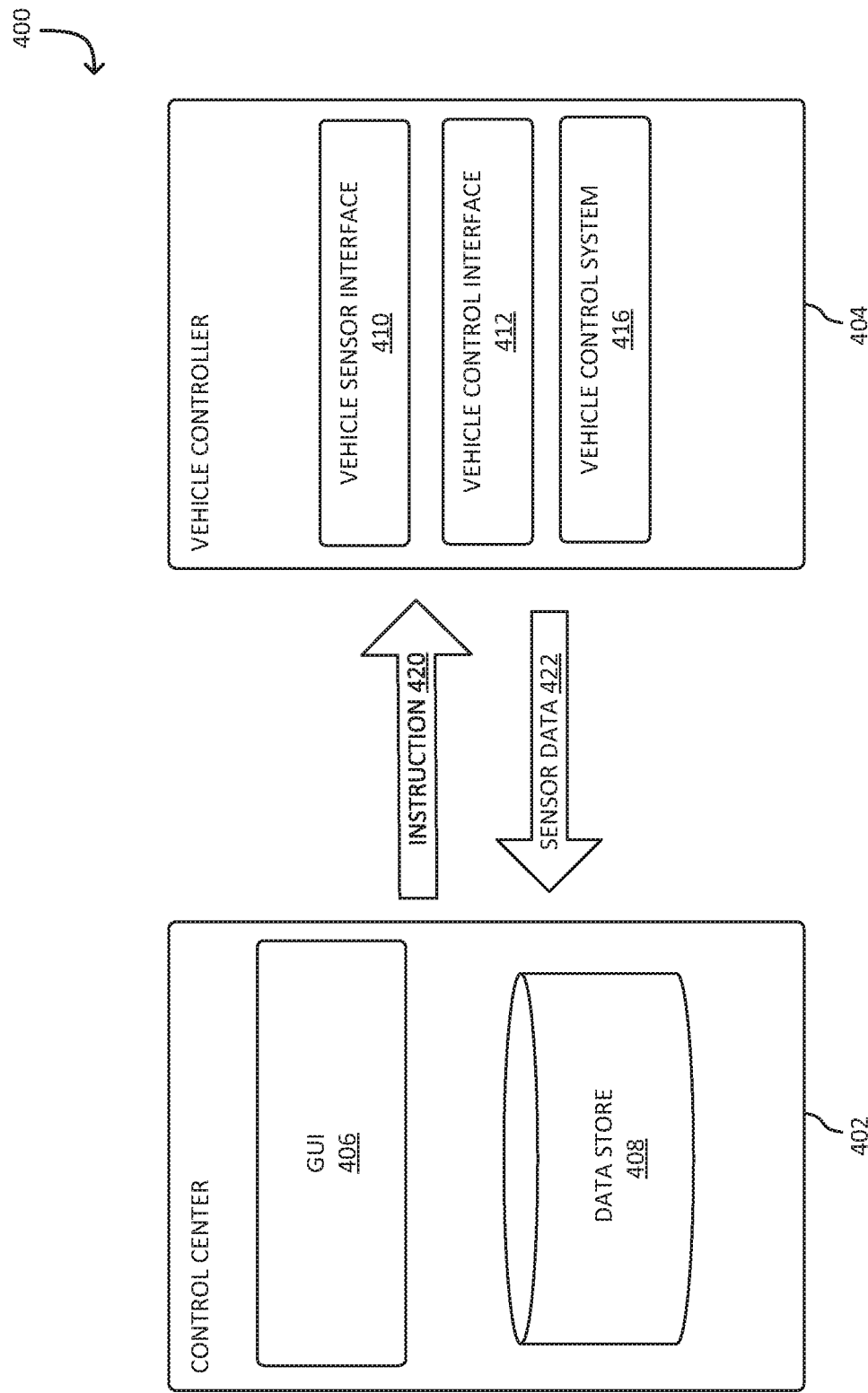
FIG. 4 illustrates another example system in which an autonomous vehicle transmits sensor data and receives instructions from a control center.

FIG. 4 illustrates an example system 400 in which an autonomous vehicle, via a vehicle controller 404 comprising a vehicle sensor interface 410, vehicle control interface 412, vehicle control system 416, and vehicle control, transmits sensor data 422 and receives instruction 420 from a control center 402 comprising a GUI 406 and a data store 408. In various examples, the autonomous vehicle that utilizes the vehicle controller 404, the sensor data 422, the instruction 420, the control center 402, and the GUI 406 are the same as the autonomous vehicle 202, the sensor data 208, the instruction 210, the control center 212, and the GUI 214, respectively, as described in connection with FIG. 2. In some examples, the autonomous vehicle may include one or more subsystems of architecture 900, described below in reference to FIG. 9.

The vehicle controller 404 may include various computing systems, such as one or more servers, virtual computing instances, data stores, etc., and/or variations thereof, configured to provide controls for the autonomous vehicle. The vehicle controller 404 may be implemented in the form of hardware, software, and/or various combinations of both. The vehicle controller 404 may be physically present on the autonomous vehicle, or may be accessed through one or more networks by the autonomous vehicle. In an embodiment, the vehicle controller 404 provides controls for the autonomous vehicle to operate autonomously.

The vehicle controller 404 may comprise the vehicle sensor interface 410. The vehicle sensor interface 410 may be a collection of computer hardware and/or software designed to communicate information between various sensors the autonomous vehicle may comprise and the autonomous vehicle. The various sensors may include devices such as Radar detection systems, LIDAR systems, time of flight, imaging systems, GPS systems, position/orientation systems, and/or variations thereof. The vehicle sensor interface 410 may gather data from the various sensors and provide the data to various subsystems the autonomous vehicle may comprise. Additionally, in some examples, the vehicle sensor interface 410 may provide data to external parties, such as the control center 402.

The vehicle controller 404 may also comprise the vehicle control interface 412. The vehicle control interface 412 may be a collection of computer hardware and/or software configured to provide controls, which may be generated by the vehicle control system 416, to the autonomous vehicle. The vehicle control interface 412 may interface with various components of the autonomous vehicle such that the autonomous vehicle can be completely controlled through the vehicle control interface 412. The vehicle controller 404 may also comprise the vehicle control system 416. The vehicle control system 416 may be a collection of computer hardware and/or software configured to determine controls for the autonomous vehicle. The vehicle control system 416 may comprise various machine learning and artificial intelligence programs and/or applications, which may be implemented as hardware and/or software. The vehicle control system 416 may utilize sensor data, which may be provided by the vehicle sensor interface 410, to determine controls for the autonomous vehicle. In some examples, the vehicle control system 416 may be provided with a destination, in which it may determine controls for the autonomous vehicle to proceed to the destination.

The control center 402 may comprise the data store 408. The data store 408 may be a repository for data objects, such as database records, flat files, and other data objects. Examples of data stores include file systems, relational databases, non-relational databases, object-oriented databases, comma delimited files, and other files. In some examples, the data store 408 may be separate from the control center 402 and hosted or provided by a data storage service or other networked computing services provider or system. The data store 408 may store data such as sensor data, control data, and navigational data, which may be accessed and utilized by the control center 402.

In some examples, the autonomous vehicle may be programmed with (or otherwise receive) a destination. The autonomous vehicle may utilize the vehicle controller 404 to proceed to the destination. The autonomous vehicle may encounter a situation that it is unable to navigate, but must navigate in order to proceed to the destination. The autonomous vehicle may detect the situation is unable to be navigated based at least in part on sensor data from the autonomous vehicle. The autonomous vehicle may transmit sensor data 422, as well as other data regarding the situation and a request to seek guidance, to the control center 402. The control center 402 may receive and analyze the transmitted sensor data 422 along with the request. An entity, such as an operator, may utilize the control center 402 to select a course of action, via the GUI 406, for the autonomous vehicle to navigate the situation. The course of action may be transmitted back to the autonomous vehicle, which may be received by the autonomous vehicle via the vehicle controller 404, in the form of the instruction 420. The autonomous vehicle may utilize the instruction 420, as well as various systems of the vehicle controller 404, to navigate the situation.

Figure 5:
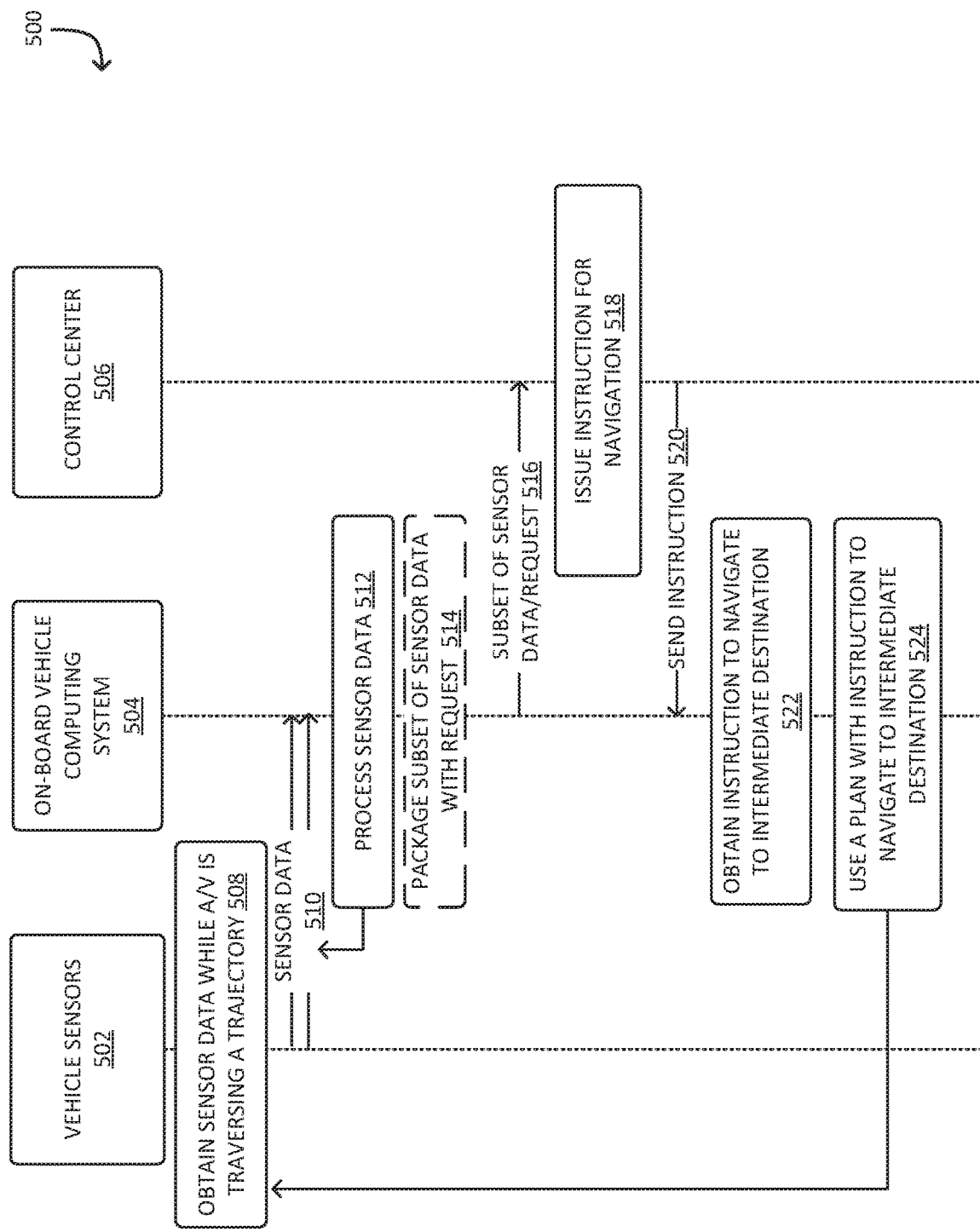
FIG. 5 illustrates example communications between an autonomous vehicle and a control center.

FIG. 5 illustrates example communications 500 between vehicle sensors 502 and on-board vehicle computing system 504 of an autonomous vehicle and a control center 506. In various examples, the autonomous vehicle and the control center 506 are the same as the autonomous vehicle 202 and the control center 212 as described in connection with FIG. 2. In some examples, the on-board vehicle computing system 504 may include one or more systems of the vehicle controller 404 as described in connection with FIG. 4. In some examples, the autonomous vehicle may include one or more subsystems of architecture 900, described below in reference to FIG. 9.

The autonomous vehicle may be programmed with a destination, and may be proceeding to the destination utilizing a machine learned model, a navigational plan with a set of instructions, and/or programmed instructions that the autonomous vehicle may comprise. The autonomous vehicle may encounter a situation that it is unable to navigate. The situation may include an object or an environmental condition that has caused the autonomous vehicle to be stuck (or otherwise a situation in which the vehicle must violate a policy for safety—e.g., to move for an emergency vehicle over a double yellow line). The autonomous vehicle may detect that the situation is not able to be navigated based at least in part on sensor data from the autonomous vehicle and may require some assistance to be unstuck from the situation. At operation 508, the vehicle sensors 502 may obtain sensor data while the autonomous vehicle ("A/V") is traversing the trajectory. The vehicle sensors 502 may obtain various sensor data. The sensor data may be communicated to one or more on-board vehicle computing systems 504, at operation 510. In some examples, the vehicle sensors 502 may communicate sensor readings and data to one or more computing systems of one or more vehicle subsystems. The on-board vehicle computing system 504 may process the sensor data at operation 512. In an embodiment, the on-board vehicle computing system 504 analysis the sensor data to determine whether a set of conditions have been satisfied to send a request to control 506 for guidance. That is, in an embodiment, the on-board vehicle computing system 504 may determine, based on processing the sensor data, that the autonomous vehicle is stuck and may require assistance from the control center to free the autonomous vehicle from the stuck position. In at least some examples, such a request may comprise an indication of the vehicle state being stopped or moving slowly (e.g., 5 mph) and that the vehicle has been in a position for a while (e.g., 30 s, 1 min, etc.), presence of certain signals (e.g., emergency vehicle lights), an amount of occlusion (e.g., 40%, 50%, etc.), or otherwise.

In some examples, the on-board vehicle computing system 504, or one or more computing systems of one or more subsystems of the vehicle, may package a subset of the sensor data (and/or representations thereof) and a request for further instruction at operation 514. At operation 516, the on-board vehicle computing system 504 may transmit the package to the control center 506. In some examples, the on-board vehicle computing system 504 may process the sensor data by converting the sensor data into an appropriate format for the control center 506. In some examples, the on-board vehicle computing system 504 may transmit the package through one or more networks, such as a cellular network and/or variations thereof.

The control center 506, at operation 518, upon receiving the packaged subset of sensor data and request for instructions, may issue instructions for navigation. The instructions may include information such speed, distance, and/or direction that the autonomous vehicle should travel to reach an intermediate destination that is within a certain radius or distance from the current position and/or orientation of the autonomous vehicle. The control center 506 may utilize the sensor data to determine appropriate instructions for the autonomous vehicle to navigate the situation it is unable to navigate. The control center 506 may process the instructions into an appropriate format, and, at operation 520, send the instructions to the autonomous vehicle, which may be received by the autonomous vehicle via the on-board vehicle computing system 504. In some examples, the control center 506 may send the instructions to the autonomous vehicle via the one or more networks that the control center 506 has received the transmitted packaged subset of sensor data and request for instructions through. In other examples, the control center 506 may utilize one or more other networks to send the instruction to the on-board vehicle computing system 504. In various examples, such an instruction may be limited to motion to a certain position (e.g., within 3 meters of the current position) and/or a desired orientation (e.g., a shift of 90 degrees).

At operation 522, the on-board vehicle computing system 504 may obtain the instruction to navigate to an intermediate destination. The on-board vehicle computing system 504 may receive the instruction sent by the control center 506, and process the instruction to determine the intermediate destination from the instruction. The intermediate destination may be a destination that allows the autonomous vehicle to navigate the situation it is unable to navigate. For example, the situation may be an occlusion; continuing with the example, the intermediate destination may be a location which provides the autonomous vehicle with more sensor visibility and, from the intermediate destination, can proceed past the current location and navigate through the situation.

At operation 524, the on-board vehicle computing system 504 may plan with the instruction obtained from the control center 506 to navigate to the intermediate destination. The on-board vehicle computing system 504 may utilize the instructions/guidance along with onboard decision-making to provide controls for the autonomous vehicle to navigate to the intermediate destination. In some examples, navigating to the intermediate destination may not fully allow the autonomous vehicle to successfully overcome the situation it was previously unable to navigate. In this case, the autonomous vehicle may repeat operations 508-524 until the situation has been resolved or navigated. Note that, depending on implementation, steps of the example communications 500 may be performed in a different order, even in parallel, with more or fewer steps from those depicted in FIG. 5. Further, the example communications 500 may be utilized by more, fewer, or different entities than those depicted in the illustrative example.

Figure 6:
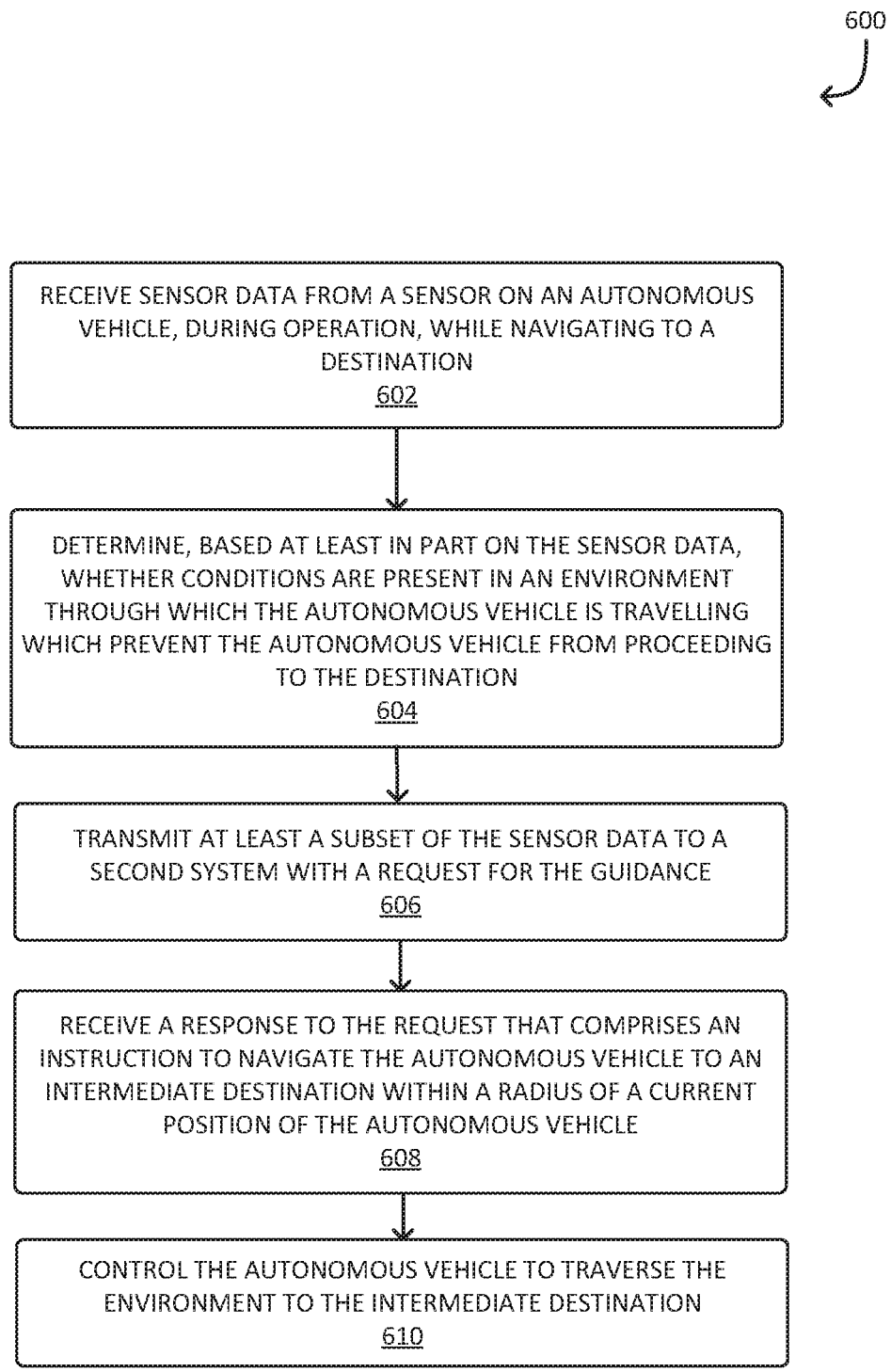
FIG. 6 illustrates an example process for processing an environment and navigating to a destination.

FIG. 6 illustrates an example process 600 for processing an environment and navigating to a destination. The process 600 may be performed by any suitable system, such as, for example, by a robotic device or autonomous vehicle, or subsystem thereof, such as on-board vehicle computing system 504, as described in connection with FIG. 5. In other examples, different operations of process 600 may be performed by various entities, such as a robotic device, autonomous vehicle, such as the autonomous vehicle 202 as described in connection with FIG. 2, and/or variations thereof.

The system performing the process 600 may, at operation 602, receive sensor data obtained during operation of an autonomous vehicle en route to a destination according to various policies and algorithms. The autonomous vehicle may be traversing toward the destination, and may comprise various algorithms which may be utilized to travel to the destination. The autonomous vehicle may also comprise various subsystems and sensors, and may produce sensor data en route to the destination. The sensor data may include data such as LIDAR data, image data, and/or variations thereof.

The system performing the process 600 may, at operation 604, determine, based at least in part on the sensor data, whether conditions are present in an environment that the autonomous vehicle is travelling indicates a need to obtain guidance from a second or different system (e.g., control center, command center, mobile phone, or laptop, etc.) resulting from conditions in an environment surrounding the autonomous vehicle that prevents the autonomous vehicle from proceeding to the destination. In various examples, the set of conditions may include analyzing the current position and situation of an autonomous vehicle operating in the environment in view of conditions such as adherence to road regulations, potential risk, navigation possibilities, and/or variations thereof. For example, the system may detect, through sensor data, that a volleyball is blocking the autonomous vehicle from proceeding, and that there are no viable paths to pass the volleyball to continue to the destination. In another example, the system may detect, through sensor data, that the autonomous vehicle has not moved past a specific amount of time (or a time limit, threshold) and is stuck in its current position and thus indicating that the autonomous vehicle is in a stuck position. Continuing with the example, the system, as a result of detecting that the autonomous vehicle is stuck, the satisfaction of one or more conditions has been identified and subsequently seeks or makes a request to a control center to seek guidance. By obtaining guidance, the autonomous vehicle may use that guidance navigate around the volleyball. In at least some examples, the vehicle may determine to call for guidance/instructions based at least in part on determining the presence of an emergency vehicle, a first responder vehicle, etc.

The system performing the process 600 may, at operation 606, transmit at least a subset of the sensor data to the second system with a request for the guidance. The system may transmit sensor data regarding the satisfied set of conditions and the environment, as well as a request for guidance to overcome to the situation preventing the autonomous vehicle from proceeding to the destination, via one or more networks to the different system. The second system may receive the sensor data and request, and determine instructions for the autonomous vehicle. The different system may return a response comprising instructions for the autonomous vehicle to overcome the situation preventing the autonomous vehicle from proceeding to the destination. The instructions for the autonomous vehicle may be a small set of data that when applied, the autonomous vehicle may perform a small motion at or below a specific speed (e.g., 5 mph).

The system performing the process 600 may, at operation 608, receive a response to the request that comprises an instruction to navigate the autonomous vehicle to an intermediate destination en route to the destination, wherein the intermediate destination is within a radius of a current position of the autonomous vehicle. The response may be transmitted via one or more networks from the different system. The instruction may direct the autonomous vehicle to travel to the intermediate destination. In some examples, the intermediate destination may be a destination that enables the autonomous vehicle to proceed to navigate or circumvent the situation the autonomous vehicle is currently in so that the autonomous vehicle may eventually reach the destination. In various examples, the intermediate destination may be located within close proximity of the current position of the autonomous vehicle. In some examples, the intermediate destination may be a rotation of the autonomous vehicle without having to travel a certain distance.

The system performing the process 600 may, at operation 610, control the autonomous vehicle to traverse the environment to the intermediate destination. The autonomous vehicle may use the planner system to determine how to complete the instruction en route to the destination. The system may utilize the instruction as an input to the planning system. The autonomous vehicle may utilize the planning system as well as the instruction to proceed to the intermediate destination and subsequently to the destination. In other examples, the autonomous vehicle may determine that further action is necessary before proceeding according to the instruction, and that further additional action is necessary before proceeding in accordance with the instruction. In yet another example, the autonomous vehicle may determine that the instruction is not viable and request further guidance from the different system. Note that, depending on the implementation, steps of the process 600 may be performed in a different order, even in parallel, with more or fewer steps from those depicted in FIG. 6.

Figure 7:
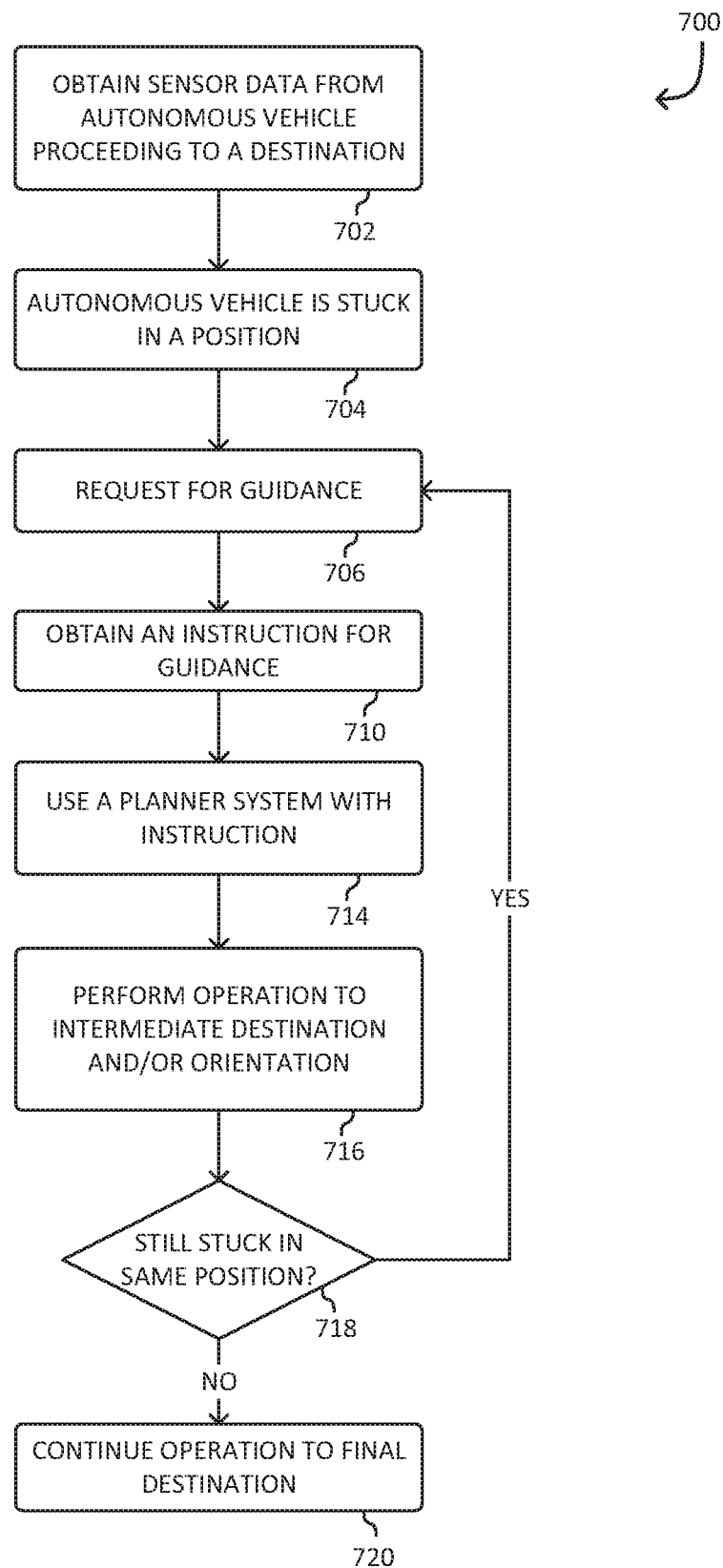
FIG. 7 illustrates an example process for navigating to a destination.

FIG. 7 illustrates an example process 700 for navigating to a destination. The process 700 may be performed by any suitable system, such as, for example, by a robotic device or autonomous vehicle, or subsystem thereof, such as on-board vehicle computing system 504, as described in connection with FIG. 5. In other examples, different operations of process 700 may be performed by various entities, such as a robotic device, autonomous vehicle, such as the autonomous vehicle 202 as described in connection with FIG. 2, and/or variations thereof.

The system performing the process 700 may, at operation 702, obtain sensor data from an autonomous vehicle proceeding to a destination. In various examples, the system performing the process 700 may be a system the autonomous vehicle comprises. The autonomous vehicle may be programmed to proceed to the destination via a route, and may utilize various machine learning models and/or applications to travel to the destination via the route. While en route to the destination, the autonomous vehicle may encounter a situation that it is unable to navigate, or is stuck in. The system performing the process 700 may, at operation 704, detect that the autonomous vehicle is stuck in a position. The position may be a position that the autonomous vehicle is unable to navigate out from. The position may also be the result of a state of the environment that comprises the autonomous vehicle, which may prevent the autonomous vehicle from completing the route to the destination.

The system performing the process 700 may, at operation 706, request for guidance. The system may request guidance from a control center such as the control center 506 as described in connection with FIG. 5. The system may request guidance, and provide various data regarding the position, as well as sensor data from sensors the autonomous vehicle may comprise, to the control center. The system performing the process 700 may, at operation 710, obtain an instruction for guidance. The instruction is generated at the control center by analyzing the provided data from the autonomous vehicle, so that a course of action may be determined, in the form of the instruction, for the autonomous vehicle to navigate from the stuck position. In some examples, the instructions are generated by another machine learned model operating on computing device at the control center. That is, the machine learned model at the control center may be configured to analyze data from the autonomous vehicle and generate an instruction without the assistance of an operator or a user.

The system performing the process 700 may, at operation 714, use a planner system with the instruction. In some examples, the autonomous vehicle may comprise various processing systems that utilize the planner system to control and navigate the autonomous vehicle. The autonomous vehicle may utilize its various processing systems to process the instruction to determine the viability of the instruction and controls to perform the instruction. The system performing the process 700 may, at operation 716, perform an operation to an intermediate destination and/or orientation. In some examples, the instruction may indicate coordinates to the intermediate destination which may be a limited radius away from the autonomous vehicle's current position. As an example, the intermediate destination may be within a 5 feet radius of the current position of the autonomous vehicle. In various examples, the operation performed by the system may be based on the instruction. The system may perform various operations in connection with the autonomous vehicle which may cause the autonomous vehicle to proceed to the intermediate destination. In some examples, the autonomous vehicle may be unable to proceed to the intermediate destination. In either case, the system performing the process 700 may, at operation 718, determine if the autonomous vehicle is still stuck in the same position.

If the autonomous vehicle is stuck in the same position, the system performing the process 700 may return to operation 706, and request for additional guidance. The system may identify additional conditions, such as changes in position, new obstructions and/or foreign objects, and the like, that may be preventing the system from utilizing and/or completing the instruction, and submit a second request for guidance. The system may obtain a second instruction for the autonomous vehicle to navigate in a different particular way, which may allow the autonomous vehicle to become unstuck. The system may repeat operations 706-718 until the autonomous vehicle is no longer stuck in the same position. If the autonomous vehicle is no longer stuck in the same position, the system performing the process 700 may, at operation 720, continue operation to final destination. The system may utilize its various processing systems to continue to proceed to the final destination. Note that, depending on the implementation, steps of the process 700 may be performed in a different order, even in parallel, with more or fewer steps from those depicted in FIG. 7.

Figure 8:
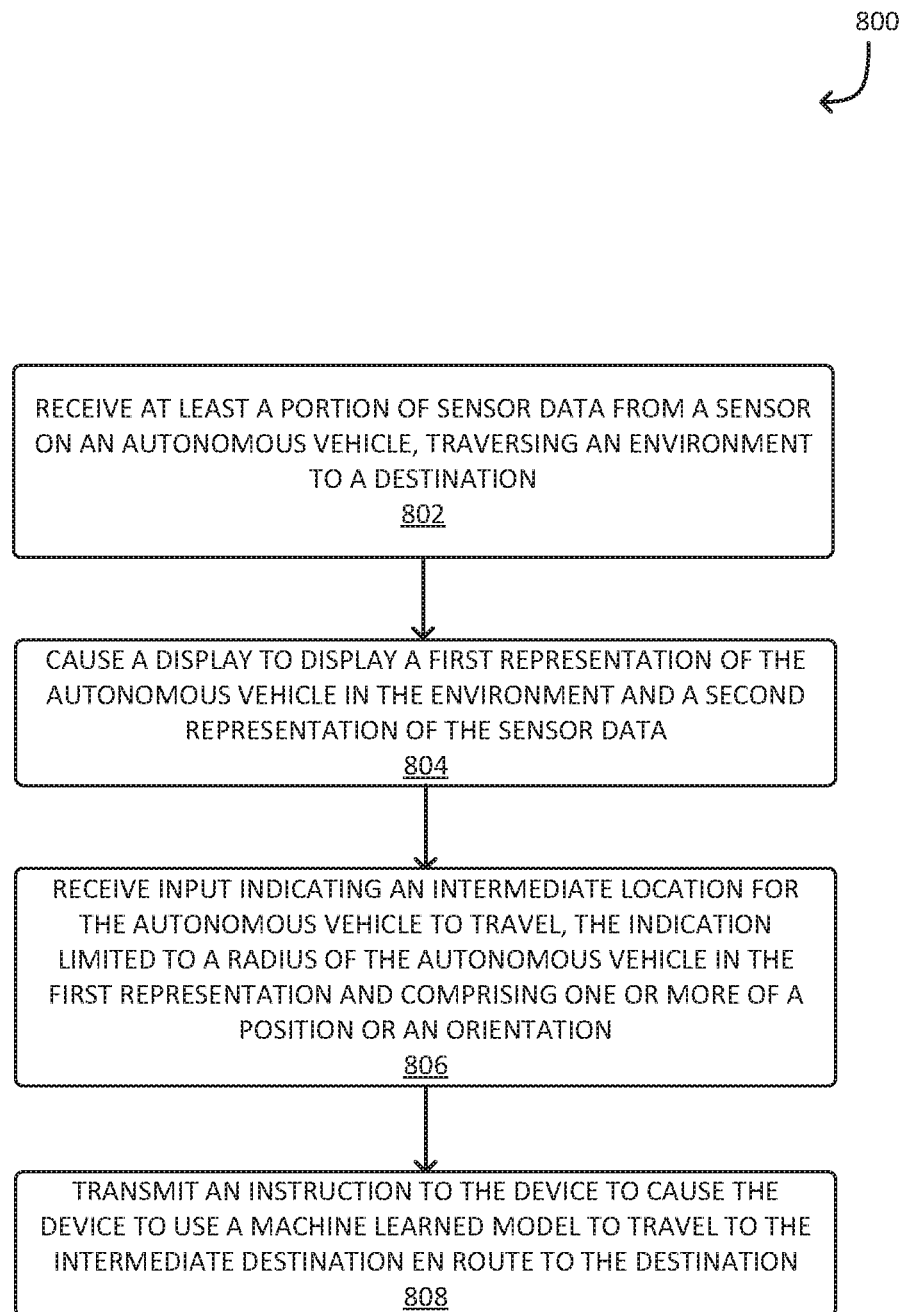
FIG. 8 illustrates an example process for processing sensor data and transmitting an instruction.

FIG. 8 illustrates an example process 800 for processing sensor data and transmitting an instruction. The process 800 may be performed by any suitable system, such as the control center 506 as described in connection with FIG. 5. In other examples, different operations of process 800 may be performed by various entities, such as a robotic device, autonomous vehicle, service, system, and/or variations thereof.

The system performing the process 800 may, at operation 802, receive at least a portion of sensor data from a sensor of an autonomous vehicle, traversing an environment to a destination. That is, receiving data from a device (e.g., autonomous vehicle) and/or data derived therefrom, while operating at a limited speed, the plurality of sensor data reflecting a state of an environment of the device en route to a destination. In various examples, the device may be an autonomous device like an autonomous vehicle, such as the autonomous vehicle 202 as described in connection with FIG. 2. The device may comprise and utilize various processing systems, which may comprise various machine learned models, to navigate. The device may process a set of instructions, use a planner system, and/or be programmed with a destination such that the device will navigate, autonomously, to the destination. The device may encounter a situation that it is unable to navigate. The device may be operating at a limited speed during the encounter of the situation. The device may recognize a situation and subsequently stop and/or slow down. The device may transmit sensor data (and/or data derived therefrom), which may be data such as LIDAR data and/or image data gathered and processed from various sensors the device may comprise, as well as additional data regarding the situation to the system performing the process 800. In various examples, the system performing the process 800 may, at 804, cause a display to display a first representation of the autonomous vehicle in the environment and a second representation of the sensor data. In an embodiment, the display is a GUI, such as the GUI 214 as described in connection with FIG. 2, based on the received transmitted data to display a first representation of the autonomous vehicle in the environment and a second representation.

The system performing the process 800 may, at 806, receive an input indicating an intermediate destination for the autonomous vehicle to travel, the indication limited to a radius of the autonomous vehicle in the first representation and comprising one or more of a position or an orientation. The system may obtain the input via one or more entities such as an operator that may have access to the system. The system performing the process 800 may obtain the input through the generated GUI. Further information regarding the GUI can be found in the description of FIGS. 2, 3, and 4. The input may indicate one or more of a position or an orientation to be performed to the intermediate destination; the intermediate destination can be a destination that the device may travel to in order to navigate through the encountered situation that it is unable to navigate.

The system performing the process 800 may process the input into instructions. The input may be processed into an appropriate format for the device. The system performing the process 800 may, at 808, transmit an instruction to the device to cause the device to us a machine learned model to travel to the intermediate destination en route to the destination. In an example, the instruction to the device may cause the device to move a certain distance away from its current position at a very slow speed and then stop. In another example, the instruction to the device may cause the device to rotate 45 degrees at a very slow rotational speed and then stop. The device may receive the instruction, and utilize a planner system, a machine learned model, and/or any sort of processing system to process the instruction. In some examples, the device may take various intermediary steps, which may be determined by a plan of the device, such as waiting for a defined amount of time, and/or variations thereof, to travel to the intermediate destination. In some examples, the various processing systems and/or machine learned model may indicate to the device that travel to the intermediate destination is not possible; the device may contact the system performing the process 800 for further instruction. Note that, depending on the implementation, steps of the process 800 may be performed in a different order, even in parallel, with more or fewer steps from those depicted in FIG. 8.

Figure 9:
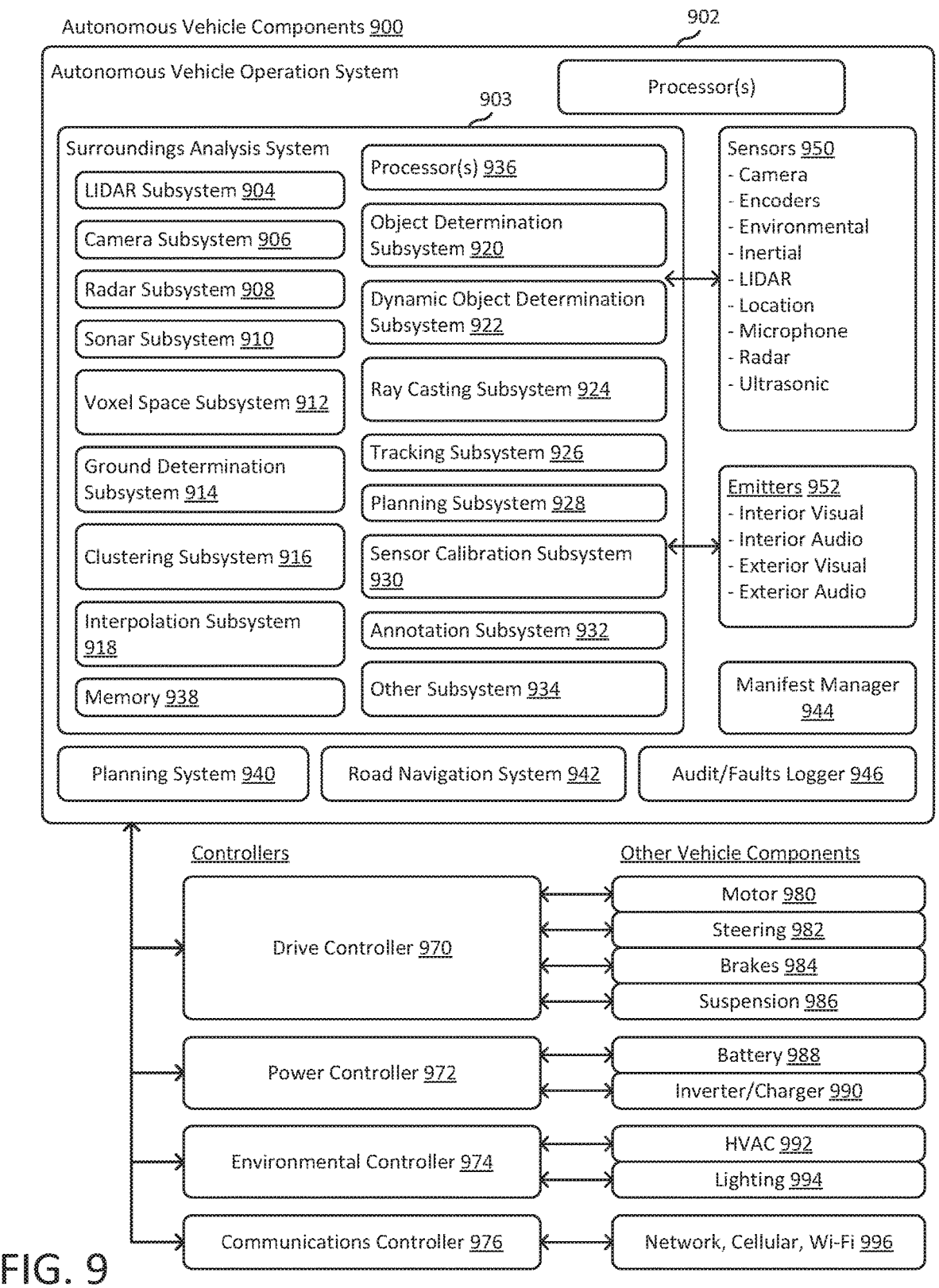
FIG. 9 illustrates an example of subsystems of an autonomous vehicle.

FIG. 9 illustrates an example of elements that might be used according to an architecture (e.g., components) 900 of an autonomous vehicle. The autonomous vehicle might be characterized as having an autonomous vehicle operation system 902, coupled to various controllers, that in turn are coupled to various components of the autonomous vehicle to handle locomotion, power management, etc. Elements of the autonomous vehicle operation system 902 provide for a computational system for implementing object identification and environment analysis, as described herein. These elements might find use in other applications outside of autonomous vehicles.

The architecture 900 may specify one or more computer system(s) including various hardware, software, firmware, etc. to implement aspects of the systems, methods, and apparatuses described herein. For example, the autonomous vehicle operation system 902 may include a surroundings analysis system 903 and other components usable for various aspects of an autonomous vehicle. The surroundings analysis system 903 might be used to take in information that the autonomous vehicle operation system 902 might use to operate controllers for a motor, steering, object avoidance, etc.

In one embodiment, surroundings analysis system 903 is the robot monitor and is programmed to issue recommendations for trajectories. The surroundings analysis system 903 might be organized as a plurality of subsystems to simplify implementation, allow for separate teams to develop for specific subsystems, or for other reasons. In some examples, the subsystems are implemented independently, while in other examples, more than one subsystem are integrated together in part or in full. The subsystems might include a LIDAR subsystem 904, a camera subsystem 906, a radar subsystem 908, a sonar subsystem 910, a voxel space subsystem 912, a ground determination subsystem 914, a clustering subsystem 916, an interpolation subsystem 918, an object determination subsystem 920, a dynamic object determination subsystem 922, a ray casting subsystem 924, a tracking subsystem 926, a planning subsystem 928, a sensor calibration subsystem 930, an annotation subsystem 932, and possibly other subsystems 934.

A given subsystem might be implemented with program code or hardware for communicating with other subsystems, to receive inputs and provide outputs. Some of the inputs might be from sensors. In some description herein, for readability, a subsystem might be described as including sensors the subsystem obtains data or signals from and/or emitters that the subsystem outputs data or signals to. For example, a sonar subsystem might be described as having an ultrasonic sensor or might be described as receiving signals from an ultrasonic sensor. As another example, a camera subsystem might be described has having a camera and a display or might be described as receiving signals or data from a camera and sending signals or data to a display.

Although not shown in FIG. 9, it should be understood that communication among subsystems can be provided for as needed. A given subsystem might communicate with another subsystem by sending data over some channel directly to the other subsystem, or the surroundings analysis system 903 might comprise a bus subsystem or communication infrastructure over which subsystems can communicate by passing data and/or signals therebetween. The surroundings analysis system 903 might also be configured to receive external data and to communicate information to outside the surroundings analysis system 903.

A given subsystem might have some of its own computational processing, which might be performed by hardware dedicated to that given subsystem or might be performed by a processor or circuit assigned to perform computation of that subsystem, as might be the case where the subsystem is implemented entirely in software and is executed by one or more processor(s) 936 using a memory 938, such as a program code memory and data storage memory. The memory might be for temporary storage of variables and data, such as RAM, and memory for permanent storage (i.e., data that persists without needing refresh, power, etc. for some period of life) and should be implied where indicated even if not explicitly mentioned. For example, where a subsystem is described as operating on a database or storing data, there would be some form of memory for storing data in electronically-readable form. In some cases, the database or data storage in memory is not specific and internal to one subsystem. In those cases, the memory is accessible by more than one subsystem. For example, one subsystem might create records based on sensor data obtained by that subsystem and write those records to a database or other data structure and, in turn, another subsystem can read and use that data. Where a subsystem is implemented in software, the subsystem might include program code coupled to a processor specific to that subsystem or a more general program code memory and processor.

In some instances, the surroundings analysis system 903 is employed in an autonomous vehicle. In some instances, the surroundings analysis system 903 may provide perception and planning functionality for the autonomous vehicle. In general, the surroundings analysis system 903 may provide for LIDAR perception, radar perception, vision (camera) perception, acoustic perception, segmentation and classification, tracking and fusion, and prediction/planning, as well as interfacing to other controllers, such as a drive controller, a power controller, an environmental controller, and a communications controller.

The autonomous vehicle operation system 902 may include a planning system 940, a road navigation system 942, a manifest manager 944, and an audit/fault logger 946. The autonomous vehicle operation system 902 might also include, or interface to, various sensors 950 and emitters 952.

The autonomous vehicle operation system 902 might interface to a drive controller 970 that interacts with motors 980, steering 982, brakes 984, and a suspension 986, a power controller 972 that interacts with a battery 988 and an inverter/charger 990, an environmental controller 974 that interacts with heating, venting, air conditioning (HVAC) components 992 and lighting 994, and a communications controller 976 that handles communications between the autonomous vehicle, devices in use with the autonomous vehicle and external devices, such as via a network, a cellular channel, or a Wi-Fi channel 996. A combination of autonomous vehicle operation system 902, the controllers, and the vehicle components installed in an autonomous vehicle can provide for a vehicle that is able to navigate safely without constant human intervention.

Referring again to the surroundings analysis system 903 and its subsystems, the LIDAR subsystem 904, the LIDAR subsystem 904 may include one or more LIDAR sensors to capture LIDAR data for segmentation, as described herein, and may comprise any one or more depth sensors as described in detail herein. In some instances, the LIDAR subsystem 904 may include functionality to combine or synthesize LIDAR data from a plurality of LIDAR sensors to generate a meta-spin of LIDAR data, which may refer to LIDAR data based on multiple LIDAR sensors. In the case of a meta spin of LIDAR data, the LIDAR subsystem 904 may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR subsystem 904 may capture data and may transmit datasets to other subsystems of the surroundings analysis system 903 for subsequent processing.

The camera subsystem 906 may include, or interface to, one or more camera sensors to capture vision data for image segmentation and/or classification. The camera subsystem 906 may include any number and type of camera sensors. For example, the camera subsystem 906 may include any color cameras, monochrome cameras, depth cameras, RGB-D cameras, stereo cameras, infrared (IR) cameras, ultraviolet (UV) cameras, etc. As may be understood in the context of this disclosure, the camera subsystem 906 may capture data and may transmit datasets to the other subsystems for subsequent processing. For example, data from the camera subsystem 906 may be included as one or more channels of a multi-channel image that is processed as such by another subsystem.

The radar subsystem 908 may include one or more radar sensors to capture range, angle, and/or velocity of objects in an environment. As may be understood in the context of this disclosure, the radar subsystem 908 may capture data and may transmit datasets to other subsystems of the surroundings analysis system 903 for subsequent processing. For example, data from the radar subsystem 908 may be included as one or more channels of a multi-channel image and provided to another subsystem.

The sonar subsystem 910 may include, or interface to, one or more speakers or sound emitters and one or more microphones (such as a microphone array) to capture acoustic information from objects in an environment. Additionally, or in the alternative, such a sonar subsystem 910 may comprise various ultrasonic transducers. For example, the sonar subsystem 910 may cause an ultrasonic transducer to emit pulses of sound and may listen for echoes to determine a position and/or motion information associated with objects in the environment. As may be understood in the context of this disclosure, the sonar subsystem 910 may capture data and may transmit datasets to the other subsystems for subsequent processing. For example, another subsystem of the surroundings analysis system 903 might fuse data obtained from the sonar subsystem 910 with data obtained from the LIDAR subsystem 904, in order to more accurately segment objects and/or to determine information about the objects, or for other purposes.

The autonomous vehicle operation system 902 may include any number or type of other sensors suitable for use in an autonomous vehicle beyond those illustrated. The various sensors 950 may include, but are not limited to, ultrasonic transducers, wheel encoders, environmental sensors, microphones, inertial measurement unit(s) (IMU), accelerometers, gyroscopes, magnetometers, temperature sensors, humidity sensors, light sensors, global positioning system (GPS) sensors, location sensors, etc.

In some instances, the LIDAR subsystem 904, the camera subsystem 906, the radar subsystem 908, and/or the sonar subsystem 910 may provide one or more datasets for other subsystems of the surroundings analysis system 903 for combining and/or synthesizing the data for improved segmentation.

The surroundings analysis system 903 may further include storage for simulated data that has been generated by a computer simulation algorithm, for use in part in testing. In some instances, the simulated data may include any type of simulated data, such as camera data, LIDAR data, radar data, sonar data, inertial data, GPS data, etc. In some instances, surroundings analysis system 903 can modify, transform, and/or perform the converting operations described herein on the simulated data for verifying an operation and/or for training machine learning algorithms, as described herein. For example, to test some functionality in a laboratory setting, simulated sensor data/signals might be supplied to subsystems as if it were actual sensor data, to test performance of some subsystems.

The voxel space subsystem 912 may include functionality to convert or map data to a voxel map. For example, the voxel space subsystem 912 can receive LIDAR data, camera data, radar data, sonar data, etc., and map, convert, or associate individual data points to a voxel map representing a three-dimensional space in an environment. A voxel space is a logical representation of a three-dimensional environment, such as the space surrounding an autonomous vehicle, that is represented as discrete small volumes, e.g., voxels. A voxel map provides data or values for respective voxels in the voxel space. As a representation of the three-dimensional environment, the voxel map can be stored in memory and manipulated by a processor.

In some instances, the voxel space subsystem 912 can define dimensions of a voxel space, including a length, width, and height of the voxel space. Further, the voxel space subsystem 912 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space. Additionally, or in the alternative, such the voxel space subsystem 912 may comprise a transformation between a virtual origin and an origin of the voxel space. In some instances, the voxel space subsystem 912 may include functionality to generate a sparse voxel space wherein voxels that do not include data, or that include an amount of data below a data threshold, need not be present in the voxel map and the values of those voxels can be assumed or ignored. In such an instance, the voxel map may be organized as an octomap, a voxel hashing, or the like. In some instances, the voxel space subsystem 912 may include functionality to reduce an amount of noise in the data of a voxel map or the data used to generate the voxel map by filtering data as it is mapped to the voxel space and stored in the voxel map. For example, filtering may include removing data below a threshold amount of data per voxel (e.g., a number of LIDAR data points associated with a voxel) or over a predetermined number of voxels (e.g., a number of LIDAR data points associated with a number of proximate voxels). In some instances, the voxel space subsystem 912 can update a voxel map as data is gathered over time, and or in response to an autonomous vehicle navigating within the real-world environment the voxel space corresponds to. For example, the voxel space subsystem 912 may add data and/or discard data from the voxel map as an autonomous vehicle navigates in an environment.

In some instances, the voxel space subsystem 912 can initialize the voxel map, and other voxel space parameters, such as voxel size, orientation, and extent, treating the initial voxel map as representing as empty space and the voxel space subsystem 912 can build up representations of objects as LIDAR data is captured over time. In other instances, the voxel space subsystem 912 can initialize the voxel map and voxel space parameters using global map data so that locally captured LIDAR data can be used to localize the autonomous vehicle within the global map space, and can be used to clean up or clear voxels of the global map.

The ground determination subsystem 914 may include functionality to parse through individual voxels of the voxel space to determine a ground associated with the environment in the voxel space. For example, the ground determination subsystem 914 may determine a locally flat voxel by estimating a plane representative of the data associated with a particular voxel and determining a normal vector of the plane. For example, the ground determination subsystem 914 may perform a principal component analysis on the voxels of a voxel map to determine a smallest principal component associated with the data associated with the voxel. In some examples, for a principal component analysis, the smallest eigenvector may correspond to the normal vector of the plane, while an eigenvalue associated with the eigenvector may correspond to a spread or level of diffusion of the data associated with the particular voxel in the direction of the smallest eigenvector.

By way of another example, and without limitation, such a surface normal determination may be done by calculating the normal of the cross product of vectors indicating directions from a point P in a voxel, to two of P's nearest neighbors. By way of another example and without limitation, such a surface normal determination may be done by performing an eigenvalue decomposition on the covariance matrix associated with an individual voxel. In some instances, the ground determination subsystem 914 may determine whether a target voxel is a locally flat voxel by determining a surface associated with the target voxel based on values associated with neighboring voxels. Further, in some instances, the ground determination subsystem 914 may utilize a marching cubes-type algorithm to create a mesh based on average point values associated with voxels to determine triangles including at least three points to create a surface. Further, the ground determination subsystem 914 may receive a reference orientation, which may correspond to a direction or an orientation of an autonomous vehicle. The ground determination subsystem 914 may determine that a voxel is a locally flat voxel if the normal vector associated with the voxel is within a threshold amount of the reference orientation, as described above.

The clustering subsystem 916 may operate in conjunction with the ground determination subsystem 914 to determine a ground region, perhaps by growing a representation of a ground region in memory, starting with a surface that is closest to the origin of the LIDAR data, or starting with a surface that is under an autonomous vehicle. That is, voxels at positions in a voxel space that correspond to real-world positions proximate to an autonomous vehicle may be used as seed voxels by the clustering subsystem 916, which can then extend representations of voxels from those seed voxels. The clustering subsystem 916 may determine that locally flat voxels that are adjacent belong to a same cluster, and may grow a region to encompass a ground plane. Further, the clustering subsystem 916 may operate in conjunction with the object determination subsystem 920, discussed below, to determine that voxels, in a cluster or otherwise, are associated with a particular object. The clustering subsystem 916 may utilize a variety of clustering algorithms, including but not limited to region growing, hierarchical clustering, partitional clustering, square error clustering, graph theoretic clustering, mixture-resolving clustering, mean-seeking clustering, k-means clustering, N-cut clustering, proximity clustering, etc.

The interpolation subsystem 918 may operate in conjunction with the ground determination subsystem 914 and/or the clustering subsystem 916 to combine or associated various clusters together to expand a representation of a ground plane. For example, locally flat voxels may not form a single cluster when determining the ground region associated with the autonomous vehicle, in which case, the interpolation subsystem 918 may interpolate between points to determine if a gradient is above or below a threshold gradient for growing the ground plane cluster. Additional examples of the ground determination subsystem 914, the clustering subsystem 916, and the interpolation subsystem 918 might be provided elsewhere herein as needed for understanding of those subsystems.

The object determination subsystem 920 may include functionality to determine objects represented in the voxel space by the voxel map. For example, the object determination subsystem 920 may receive an indication of the ground plane from the ground determination subsystem 914 and/or receive an indication of some or all of the locally flat voxels and may remove the voxels associated with a ground from the voxel space, so that the voxel map might only contain values for other voxels. Next, the object determination subsystem 920 may parse through the remaining voxels to determine objects based on connectivity of voxels. For example, the object determination subsystem 920 may operate in conjunction with the clustering subsystem 916 to grow regions in the voxel space corresponding to objects by determining that adjacent voxels are to be considered to be a part of a same object. The object determination subsystem 920 may assign an object identifier to all voxels associated with a particular object, and in some instances, the object identifier assigned or determined by the object determination subsystem 920 may be propagated to LIDAR data associated with voxels comprising the particular object. The additional information about objects, grounds, clusters, and the like might be stored with the voxel map or as separate data structures. Additional examples of the object determination subsystem 920 might be provided elsewhere herein as needed for understanding of the object determination subsystem 920.

The dynamic object determination subsystem 922 may include functionality to distinguish between static objects and dynamic objects that might be determined to be present in the space corresponding to the voxel space. For example, the dynamic object determination subsystem 922 may accumulate data over time to determine motion of objects by comparing voxel values at a first time to the voxel values at a second time to determine if an occupancy of the voxel has changed over time. For example, if a voxel was occupied by an object at a first time and is not occupied by the object at a second time, the dynamic object determination subsystem 922 might deem that object to be a dynamic object and record that assessment as voxel map data. Based on which voxels are occupied or not occupied over time, the dynamic object determination subsystem 922 can determine a movement of the dynamic object, such as a speed and direction of movement. In some instances, the dynamic object determination subsystem 922 can provide an indication to determine a movement from the dynamic objects. Additional examples of the dynamic object determination subsystem 922 might be provided elsewhere herein as needed for understanding of the object determination subsystem 922.

The ray casting subsystem 924 may operate in conjunction with the dynamic object determination subsystem 922 to distinguish between static objects and dynamic objects. Further, the ray casting subsystem 924 may include functionality to clear the voxel map over time as data accumulates in the representation of the voxel map. For example, as an object moves throughout the voxel space over time, the representation of voxels occupied by a dynamic object may involve more and more data over time. However, the ray casting subsystem 924 may analyze a path of a ray associated with LIDAR data, for example, to determine that some voxels through which the ray travels should be deemed cleared and the corresponding storage in the voxel map be cleared. Thus, the ray casting subsystem 924 may provide additional functionality to determine that voxels occupied at a first time are not occupied at a second time, which may be provided to the various subsystems to determine that objects are dynamic objects, for example. In some instances, the voxel map may be represented in a sparse manner (e.g., providing data representing occupied voxels and disregarding unoccupied voxels) or in a dense manner (e.g., without discarding voxels). In some instances, the ray casting subsystem 924 may store ray casting information in a dense manner, which is to say that voxels that don't exist in a sparse voxel representation (e.g., because voxels do not have associated LIDAR data) can have ray casting information associated with such voxels. For example, voxels without associated LIDAR data can nevertheless be represented in a dense voxel map to include ray casting information associated with the voxels of the voxel space. In some instances, the dense voxel representation may associate positive information with a voxel that a voxel is unoccupied, at least partly in response to the ray casting operations discussed herein. Further, as LIDAR data is accumulated for individual voxels, the negative information may be associated in the voxel map with individual voxels to indicate that they are occupied with a static object, for example. As data is accumulated over time, the information can be aggregated, in part, to determine whether a voxel corresponds to open space or a static object, for example. Further, the ray casting subsystem 924 may be used to clean up a global map by comparing the locally captured LIDAR data against global map data. Additional examples of the ray casting subsystem 924 might be provided elsewhere herein as needed for understanding of the ray casting subsystem 924.

The tracking subsystem 926 may include functionality to receive an indication of one or more dynamic objects and perform additional processing in order to track the objects. For example, the tracking subsystem 926 may determine a velocity of a dynamic object and/or may determine and store a trajectory of the dynamic object over time. In some instances, the tracking subsystem 926 may be programmed to perform a prediction algorithm that may predict a path of the object to be tracked based on previous motion of the object.

The planning subsystem 928 may include functionality to receive segmented data and/or indications of the ground plane, static objects, and/or dynamic objects to determine a trajectory of an autonomous vehicle. For example, the planning subsystem 928 may receive segmentation information identifying the ground plane and may generate a trajectory for the autonomous vehicle to follow.

The sensor calibration subsystem 930 may include functionality to calibrate one or more sensors based at least in part on the segmentation information determined with respect to an environment. For example, while sensor data from the LIDAR subsystem 904, camera subsystem 906, radar subsystem 908, and/or sonar subsystem 910 may be used to estimate a location and/or orientation (e.g., using simultaneous localization and mapping (SLAM)), an autonomous vehicle may also include additional sensors, such as an inertial measurement unit (IMU) and/or a GPS unit, for determining a location of the autonomous vehicle in an environment. In some instances, the IMU may indicate that the autonomous vehicle is in a first location, while an analysis of the LIDAR data discussed herein indicates that the vehicle is in a second location different from the first location. The sensor calibration subsystem 930 may determine a difference in the locations and may adjust or calibrate one more sensors to update a location of the autonomous vehicle or one or more sensor intrinsic characteristics or extrinsic characteristics.

The annotation subsystem 932 may include functionality to receive segmentation information discussed herein and may annotate the ground plane, static objects, and/or dynamic objects with information associated with the objects, stored as data with the voxel map or otherwise. In some instances, the annotation subsystem 932 may provide segmentation information in a graphical user interface for manual verification and/or adjustment by a technician, for example. In some instances, the annotation subsystem 932 may include functionality to determine and apply a classification of the objects discussed herein. The annotation subsystem 932 may be programmed to perform machine learning algorithms, such as neural networks processes, to perform operations of segmentation and classification.

An exemplary neural network might pass input data through a series of connected layers to produce an output. One example of a neural network may include a convolutional neural network, or CNN. Each layer in a CNN may also comprise another CNN, or may comprise a number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), dimensionality reduction algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), ensemble algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The environment depicted in FIG. 9 might be implemented with one or more computer systems that comprise storage, one or more processor(s), memory, and possibly an operating system The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various examples of the methods described herein may be combined or merged into other functions.

An exemplary environment and computerized system for implementing the systems and methods might include a processor or computer system can be configured to particularly perform some or all of the methods described herein. In some examples, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some examples, the illustrated system elements could be combined into a single hardware device or separated into multiple hardware devices. If multiple hardware devices are used, the hardware devices could be physically located proximate to or remotely from each other. The examples of the methods described and illustrated are intended to be illustrative and not to be limiting. For example, some or all of the steps of the methods can be combined, rearranged, and/or omitted in different examples.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some examples, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In these examples, the processing system may use an object-relational mapper (ORM) to store the data objects in a relational database. The systems and methods described herein can be implemented using any number of physical data models. In one example embodiment, a relational database management system (RDBMS) can be used. In those examples, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary examples, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more examples, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such examples may also include a Controller Area Network (CAN) bus.

In one or more examples, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the examples described herein are not limited to one particular context and may be applicable to any application utilizing machine vision.

In one or more examples, the present examples can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present examples may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the examples include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present examples, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Examples of the present disclosure may include apparatuses for performing the operations herein. An apparatus may be specially constructed for the desired purposes, or it may comprise a general purpose device selectively activated or reconfigured by a program stored in the device.

In one or more examples, the present examples are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the examples can include a machine-readable medium having instructions stored on it. The instructions can be used to program any processor or processors (or other electronic devices) to perform a process or method according to the present exemplary examples. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a subsystem, component, subroutine, or other unit suitable for use in a computing environment. The software can include, but is not limited to, firmware, resident software, microcode, etc. Protocols such as SOAP/HTTP may be used in implementing interfaces between programming subsystems. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, subsystems, and methods described herein can be implemented using any combination of software or hardware elements. The systems, subsystems, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more examples of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various examples," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular examples, "connected" may be used to indicate that two or more elements are in direct physical or electrical contact with each other. "Coupled" may mean that two or more elements are in direct physical or electrical contact. However, "coupled"

may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

Moreover, as used herein, the term "and/or" may refer to the same as "or" and may refer to one or more items in a list.

While one or more examples have been described, various alterations, additions, permutations and equivalents thereof are included within the scope of the disclosure.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

Embodiments of the disclosure can be described in view of the following clauses:

1. A system, comprising: one or more processors; and non-transitory computer readable memory including instructions that, when executed by the one or more processors, cause the system to perform operations comprising: receiving sensor data from a sensor on an autonomous vehicle navigating to a destination; determining, based at least in part on the sensor data, whether conditions are present in an environment through which the autonomous vehicle is travelling which prevent the autonomous vehicle from proceeding to the destination; transmitting at least a subset of the sensor data to a second system with a request for guidance; receiving a response to the request that comprises an instruction to navigate the autonomous vehicle to an intermediate destination within a radius of a current position of the autonomous vehicle; and controlling the autonomous vehicle to traverse the environment to the intermediate destination.

2. The system of clause 1, wherein determining whether conditions are present in the environment through which the autonomous vehicle is travelling which prevent the autonomous vehicle from proceeding to the destination comprises one or more of: determining that the autonomous vehicle has remained in a current position for a specified amount of time, or determining a presence of an emergency vehicle.

3. The system of clause of 1 or 2, wherein determining the presence of the emergency vehicle comprises: determining the emergency vehicle is operating in an emergency state; and determining that the emergency vehicle is operating behind the autonomous vehicle such that the autonomous vehicle needs to make way for the emergency vehicle.

4. The system of any of clause 1 to 3, wherein the instruction includes an indication for the autonomous vehicle to rotate to a desired orientation.

5. The system of any of clause 1 to 4, wherein the instruction includes an indication for the autonomous vehicle to proceed to the intermediate destination by moving a specified distance away, at a limited speed, that is within a defined radius from a current position of the autonomous vehicle and to stop.

6. The system of any of clause 1 to 5, wherein the operations further comprise: receiving second sensor data from the sensor; determining, based at least in part on the second sensor data, additional conditions are present in the environment through which the autonomous vehicle is travelling which prevent the autonomous vehicle from proceeding to the destination; and transmit at least a subset of the sensor data associated with the additional conditions to the second system with a second request for guidance.

7. A non-transitory computer-readable storage medium having stored thereon executable instructions that, as a result of being executed by one or more processors of a computer system, cause the computer system to at least: receive sensor data from a sensor on a device en route to a destination; determine, based at least in part on the sensor data, satisfaction of a set of conditions for obtaining guidance; as a result of detecting satisfaction of the set of conditions, obtain an instruction to navigate to an intermediate position, wherein the instruction includes an indication of one or more of a desired orientation or a desired position for the device; and cause the device to execute the instruction while en route to the destination.

8. The non-transitory computer-readable storage medium of clause 7, wherein the sensor comprises one or more of a LIDAR sensor, a camera, a microphone, or a radar.

9. The non-transitory computer-readable storage medium of clause 7 or 8, wherein detecting the satisfaction of the set of conditions comprises one or more of: determining that an amount of time the device has been at a current position meets or exceeds a threshold amount of time; or determining the presence of an emergency vehicle.

10. The non-transitory computer-readable storage medium of clause 9, wherein determining the presence of the emergency vehicle comprises: determining the emergency vehicle is operating in an emergency state; and determining that the emergency vehicle is operating behind the device such that the device needs to make way for the emergency vehicle.

11. The non-transitory computer-readable storage medium of any of clause 7 to 10, wherein the intermediate position is within a radius from a current position of the device at a speed less than or equal to a threshold speed.

12. The non-transitory computer-readable storage medium of clause 11, wherein the device comprises an autonomous vehicle, and wherein the instructions, when executed by the one or more processors, further cause the computer system to: determine a trajectory to control the device to arrive at the destination; and cause the device to traverse an environment according to the trajectory.

13. The non-transitory computer-readable storage medium of any of clause of 7 to 12, wherein the instruction to navigate a particular way includes instructions to cause the device to rotate and to stop.

14. A method, comprising: receiving sensor data from a sensor on a device; determining, based at least in part on the sensor data, a condition of an environment through which the device is travelling; transmitting, based at least in part on the condition, a request to a remote system a request for guidance; receiving an instruction from the remote system; and causing, based at least in part on the instruction, the device to move to an intermediate position.

15. The method of clause 14, wherein the sensor comprises one or more of a LIDAR sensor, a camera, a microphone, or a radar.

16. The method of clause 14 or 15, wherein determining the condition comprises one or more of: determining that traffic conditions prevent the device from proceeding to a destination; determining that the device has exceeded a specific amount of time in a current position; or determining a presence of an emergency vehicle proximate to the device.

17. The method of clause 16, wherein determining the presence of the emergency vehicle comprises: determining the emergency vehicle is operating in an emergency state; and determining the device is obstructing a path associated with the emergency vehicle.

18. The method of any of clause 14 to 17, wherein causing, based at least in part on the instruction, the device to move to the intermediate position allows the device to add visibility.

19. The method of any of clause 14 to 18, wherein the device is an autonomous vehicle, and wherein the intermediate position comprises one or more of an intermediate location within a radius of a current position or an intermediate location, and wherein causing the device to move to the intermediate position comprises causing the device to move at or below a threshold speed.

20. The method of any of clause 14 to 19, further comprising: determining, at the intermediate position, a trajectory to reach a destination; and causing the autonomous vehicle to navigate according to the trajectory to the destination.

What is claimed is:

1. A system, comprising:
one or more processors; and
non-transitory computer readable memory including instructions that, when executed by the one or more processors, cause the system to perform operations comprising:
receiving sensor data from a sensor on an autonomous vehicle navigating to a destination;
determining, based at least in part on the sensor data, whether conditions are present in an environment through which the autonomous vehicle is travelling which prevent the autonomous vehicle from proceeding to the destination;
transmitting at least a subset of the sensor data to a second system with a request for guidance;
receiving a response to the request that comprises an instruction to navigate the autonomous vehicle to an intermediate destination within a radius of a current position of the autonomous vehicle, the instruction further indicating an orientation associated with the autonomous vehicle at the intermediate destination; and
processing the instruction to cause the autonomous vehicle to traverse the environment to the intermediate destination and align to the orientation at the intermediate destination.

2. The system of claim 1, wherein determining whether conditions are present in the environment through which the autonomous vehicle is travelling which prevent the autonomous vehicle from proceeding to the destination comprises one or more of:
determining that the autonomous vehicle has remained in a current position for a specified amount of time, or
determining a presence of an emergency vehicle.

3. The system of claim 2, wherein determining the presence of the emergency vehicle comprises:
determining the emergency vehicle is operating in an emergency state; and
determining that the emergency vehicle is operating behind the autonomous vehicle such that the autonomous vehicle needs to make way for the emergency vehicle.

4. The system of claim 1, wherein the instruction includes an indication for the autonomous vehicle to rotate to a desired orientation.

5. The system of claim 1, wherein the instruction includes an indication for the autonomous vehicle to proceed to the intermediate destination by moving a specified distance away, at a limited speed, that is within a defined radius from a current position of the autonomous vehicle and to stop.

6. The system of claim 1, wherein the operations further comprise:
receiving second sensor data from the sensor;
determining, based at least in part on the second sensor data, additional conditions are present in the environment through which the autonomous vehicle is travelling which prevent the autonomous vehicle from proceeding to the destination; and
transmit at least a subset of the sensor data associated with the additional conditions to the second system with a second request for guidance.

7. A non-transitory computer-readable storage medium having stored thereon executable instructions that, as a result of being executed by one or more processors of a computer system, cause the computer system to at least:
receive sensor data from a sensor on a device en route to a destination;
determine, based at least in part on the sensor data, satisfaction of a set of conditions for obtaining guidance;
as a result of detecting satisfaction of the set of conditions, obtain an instruction to navigate to an intermediate position, wherein the instruction includes an indication of one or more of a desired orientation and a desired position for the device; and
cause the device to execute the instruction to travel to the intermediate position and to be oriented at the intermediate position while en route to the destination.

8. The non-transitory computer-readable storage medium of claim 7, wherein the sensor comprises one or more of a LIDAR sensor, a camera, a microphone, or a radar.

9. The non-transitory computer-readable storage medium of claim 7, wherein detecting the satisfaction of the set of conditions comprises one or more of:
determining that an amount of time the device has been at a current position meets or exceeds a threshold amount of time; or
determining the presence of an emergency vehicle.

10. The non-transitory computer-readable storage medium of claim 9, wherein determining the presence of the emergency vehicle comprises:
determining the emergency vehicle is operating in an emergency state; and
determining that the emergency vehicle is operating behind the device such that the device needs to make way for the emergency vehicle.

11. The non-transitory computer-readable storage medium of claim 7, wherein the intermediate position is within a radius from a current position of the device at a speed less than or equal to a threshold speed.

12. The non-transitory computer-readable storage medium of claim 11, wherein the device comprises an autonomous vehicle, and wherein the instructions, when executed by the one or more processors, further cause the computer system to:
determine a trajectory to control the device to arrive at the destination; and
cause the device to traverse an environment according to the trajectory.

13. The non-transitory computer-readable storage medium of claim 7, wherein the instruction to navigate a particular way includes instructions to cause the device to rotate and to stop.

14. A method, comprising:
receiving sensor data from a sensor on a device;
determining, based at least in part on the sensor data, a condition of an environment through which the device is travelling;
transmitting, based at least in part on the condition, a request to a remote system a request for guidance;
receiving an instruction from the remote system, the instruction further comprising an orientation for the device at an intermediate position; and
causing, based at least in part on the instruction, the device to move to and to be oriented at the intermediate position.

15. The method of claim 14, wherein the sensor comprises one or more of a LIDAR sensor, a camera, a microphone, or a radar.

16. The method of claim 14, wherein determining the condition comprises one or more of:
determining that traffic conditions prevent the device from proceeding to a destination;
determining that the device has exceeded a specific amount of time in a current position; or
determining a presence of an emergency vehicle proximate to the device.

17. The method of claim 16, wherein determining the presence of the emergency vehicle comprises:
determining the emergency vehicle is operating in an emergency state; and
determining the device is obstructing a path associated with the emergency vehicle.

18. The method of claim 14, wherein causing, based at least in part on the instruction, the device to move to the intermediate position allows the device to add visibility.

19. The method of claim 14, wherein the device is an autonomous vehicle, and
wherein the intermediate position comprises one or more of an intermediate location within a radius of a current position or an intermediate location, and
wherein causing the device to move to the intermediate position comprises causing the device to move at or below a threshold speed.

20. The method of claim 19, further comprising:
determining, at the intermediate position, a trajectory to reach a destination; and
causing the autonomous vehicle to navigate according to the trajectory to the destination.

* * * * *